Dec. 23, 1952          L. DELFIN          2,622,801
CALCULATING MACHINE
Filed Jan. 4, 1949          30 Sheets—Sheet 1
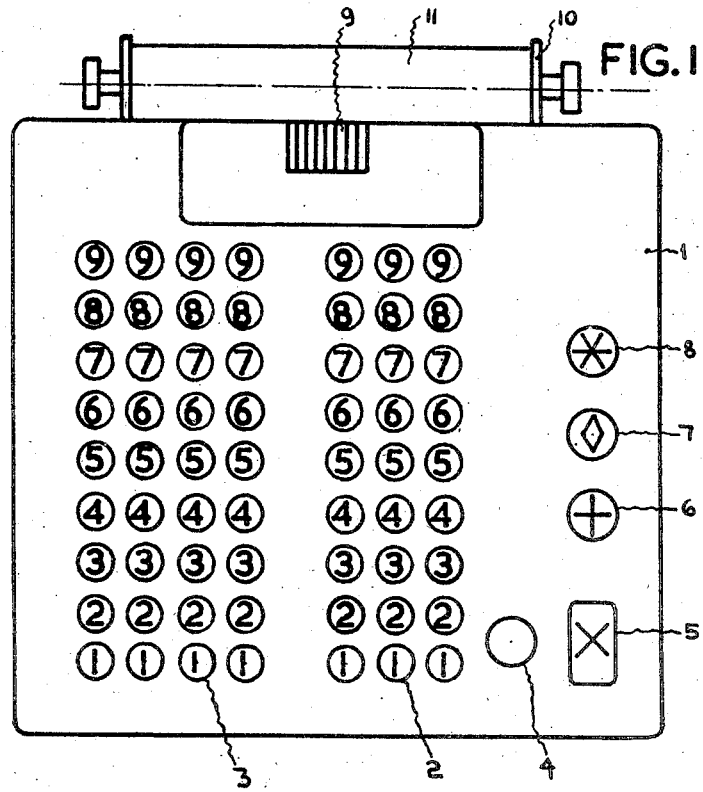
FIG. 2
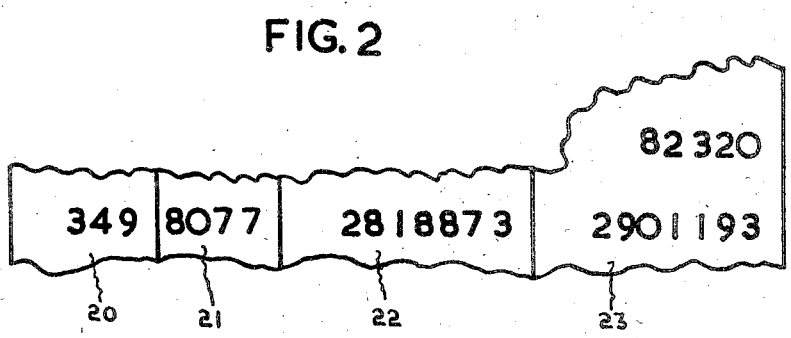
Inventor
Leslie Delfin
By
William Shaw
Attorney Dec. 23, 1952   L. DELFIN   2,622,801
CALCULATING MACHINE
Filed Jan. 4, 1949   30 Sheets-Sheet 4

Inventor
Leslie Delfin
By
William Adams
Attorney

Dec. 23, 1952 L. DELFIN 2,622,801
CALCULATING MACHINE
Filed Jan. 4, 1949 30 Sheets-Sheet 5

Dec. 23, 1952 L. DELFIN 2,622,801
CALCULATING MACHINE
Filed Jan. 4, 1949 30 Sheets-Sheet 12

Inventor
Leslie Delfin
By
William Adams
Attorney

Dec. 23, 1952 L. DELFIN 2,622,801
CALCULATING MACHINE
Filed Jan. 4, 1949 30 Sheets-Sheet 14

Dec. 23, 1952           L. DELFIN           2,622,801

CALCULATING MACHINE

Filed Jan. 4, 1949           30 Sheets—Sheet 18

Inventor
Leslie Delfin
By
William A. Davis
Attorney

Dec. 23, 1952 L. DELFIN 2,622,801
CALCULATING MACHINE
Filed Jan. 4, 1949 30 Sheets-Sheet 20

Inventor
Leslie Delfin
By
William A. Davis
Attorney

Dec. 23, 1952  L. DELFIN  2,622,801
CALCULATING MACHINE
Filed Jan. 4, 1949  30 Sheets-Sheet 25

Inventor
Leslie Delfin
By
William Davis
Attorney

Dec. 23, 1952  L. DELFIN  2,622,801
CALCULATING MACHINE
Filed Jan. 4, 1949  30 Sheets-Sheet 26
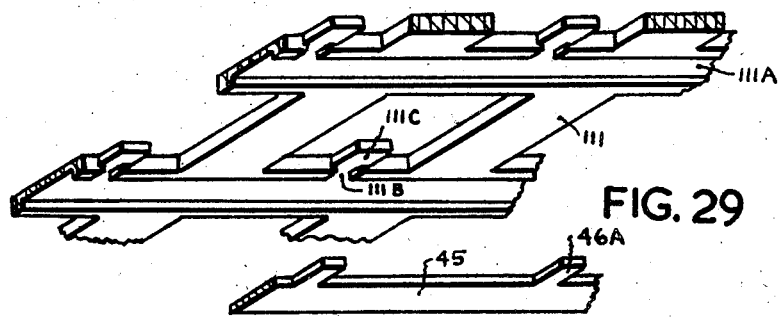
FIG. 29
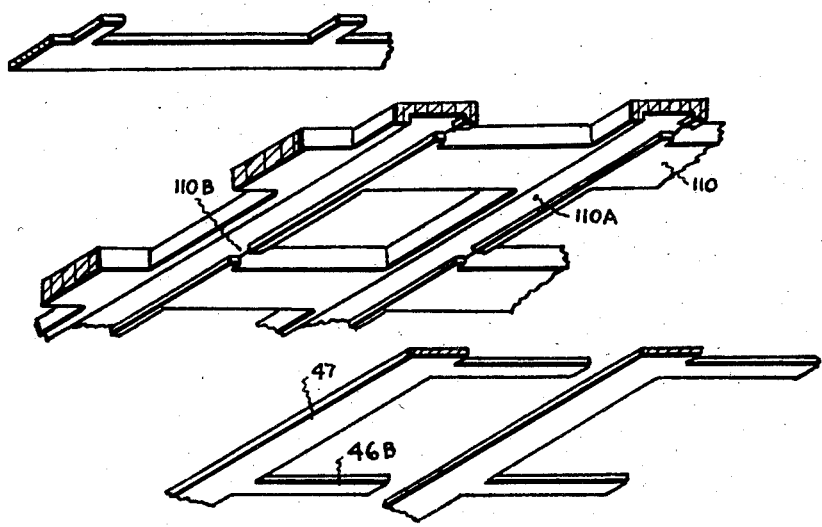
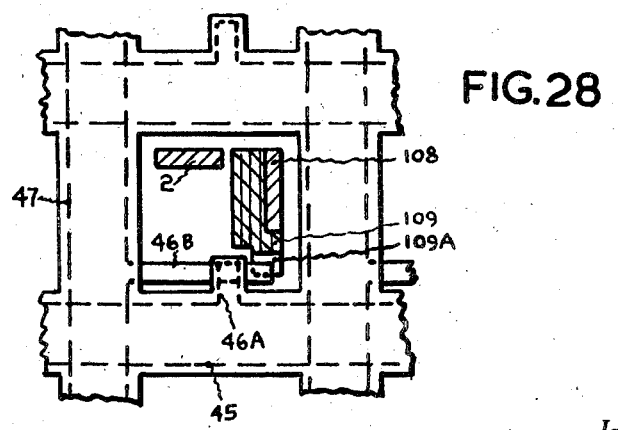
FIG. 28
Inventor
Leslie Delfin
By
William Straus
Attorney

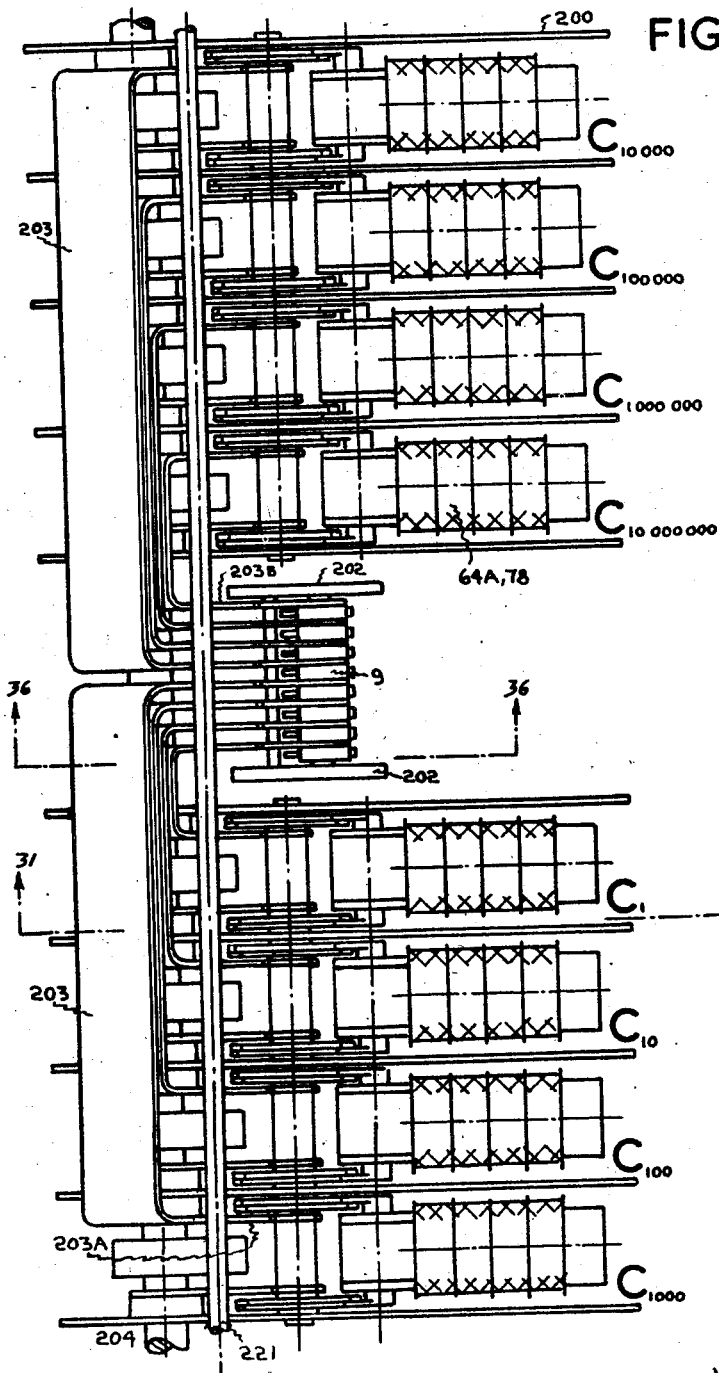

Dec. 23, 1952 L. DELFIN 2,622,801
CALCULATING MACHINE
Filed Jan. 4, 1949 30 Sheets-Sheet 28

Inventor
Leslie Delfin
By
William Davis
Attorney

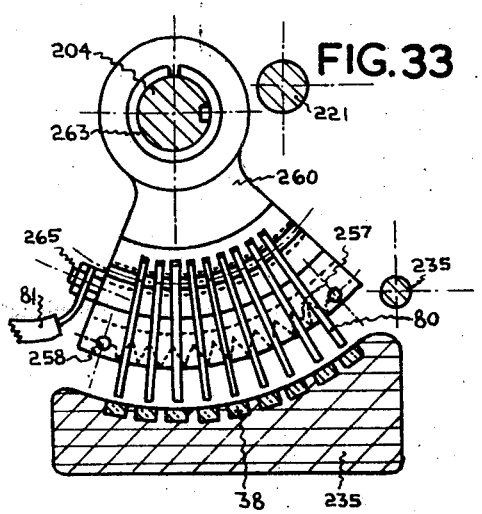
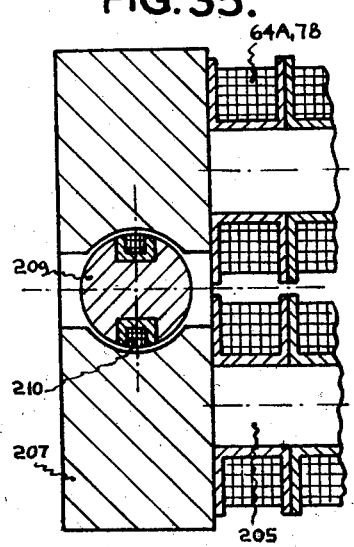
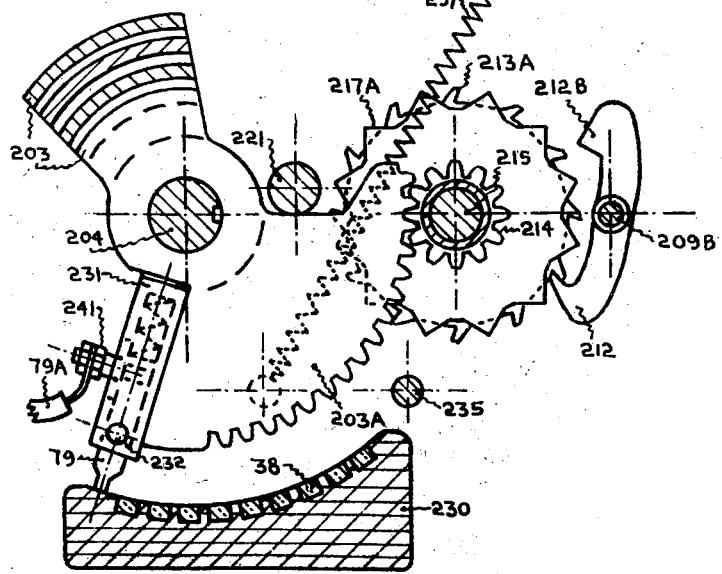

Dec. 23, 1952  L. DELFIN  2,622,801
CALCULATING MACHINE

Filed Jan. 4, 1949  30 Sheets-Sheet 30.

Inventor
Leslie Delfin
By
William Swan
Attorney

Patented Dec. 23, 1952

2,622,801

UNITED STATES PATENT OFFICE 2,622,801

CALCULATING MACHINE

Leslie Delfin, Worcester, England

Application January 4, 1949, Serial No. 69,134
In Great Britain July 15, 1948

6 Claims. (Cl. 235—61)

This invention relates to electrical calculating machines, especially suitable for carrying out operations of multiplication.

Electrical multiplying machines have already been proposed for the multiplication of two multi-denominational numbers in which all the digits of the multiplicand are multiplied simultaneously by one digit of the multiplier in one cycle, these cycles being repeated for each digit of the multiplier. The quantities occurring during the operation of multiplication are represented in these machines by a corresponding number of electrical impulses, controlled by rotating commutators.

One of the objects of the present invention is to provide a machine which can always carry out in one single cycle the multiplication of two multi-denominational numbers, regardless of the number of digits in both factors.

Another object of the present invention is a calculating machine which can be fitted with a printing mechanism in an easy and economical way.

Another object of the present invention is to carry out the multiplication of two multi-denominational numbers in one single cycle at a very high speed, this said speed being limited only by the time necessary to overcome the inertia of the moving parts in the counting and printing mechanisms.

Another object of the present invention is to provide a machine of very simple and economical construction in which the number of different parts is very small, and in which shafts and gears revolving at high speed, column shifting mechanisms, and similar characteristic parts of other calculating machines are eliminated.

Another object of the present invention is to provide a machine which can be adapted for the multiplication of two numbers not expressed in the decimal system, e. g. for the multiplication of a weight expressed in tons, hundred weights, quarters and pounds with a price expressed in pounds, shillings and pence, and giving a result expressed either in pounds, shillings and pence, or in any required system.

According to the invention, the digits of the two factors and the other quantities occurring during the arithmetical operations, are represented in the machine by electrical currents of proportional intensity.

It is well known that for a given voltage and temperature it is easy to obtain in an electrical circuit a current, the intensity of which corresponds exactly to a prescribed value. However, great practical difficulties arise in keeping the voltage and the temperature steady and in translating the intensity of the electrical currents into exactly corresponding mechanical movements in the counting mechanisms.

The present invention overcomes these difficulties by not measuring directly the current intensities but by comparing them with other currents of known intensities, the actions of these currents to be compared on the mechanisms of the machine depending only upon whether they are balanced, or upon which is stronger. As the current intensities to be compared can differ only by the multiple of a certain minimum difference, small deviations from the prescribed current values are admissible. Further, as it is only the relative intensity of the currents in the circuits which is being compared, and as all the currents are supplied by the same voltage source, the functioning of the machine is independent of the voltage variations of that source, means to be described later being provided to balance the effects of eventual local temperature differences inside the machine.

Reference may be had to the accompanying drawings in which:

Figure 1 shows a plan view of the machine.

Figure 2 shows portion of a paper strip as printed by the machine.

Figure 28 shows the horizontal section of a multiplier key.

Figure 29 shows an exploded isometric view of portion of the conductors and insulators of the multiplier keyboard.

Figure 30 shows a plan view of the counters and the printing mechanism.

Figure 33 shows the accumulator.

Figure 34 shows another vertical section through the counter.

Figure 35 shows a section through an armature.

Figure 3:
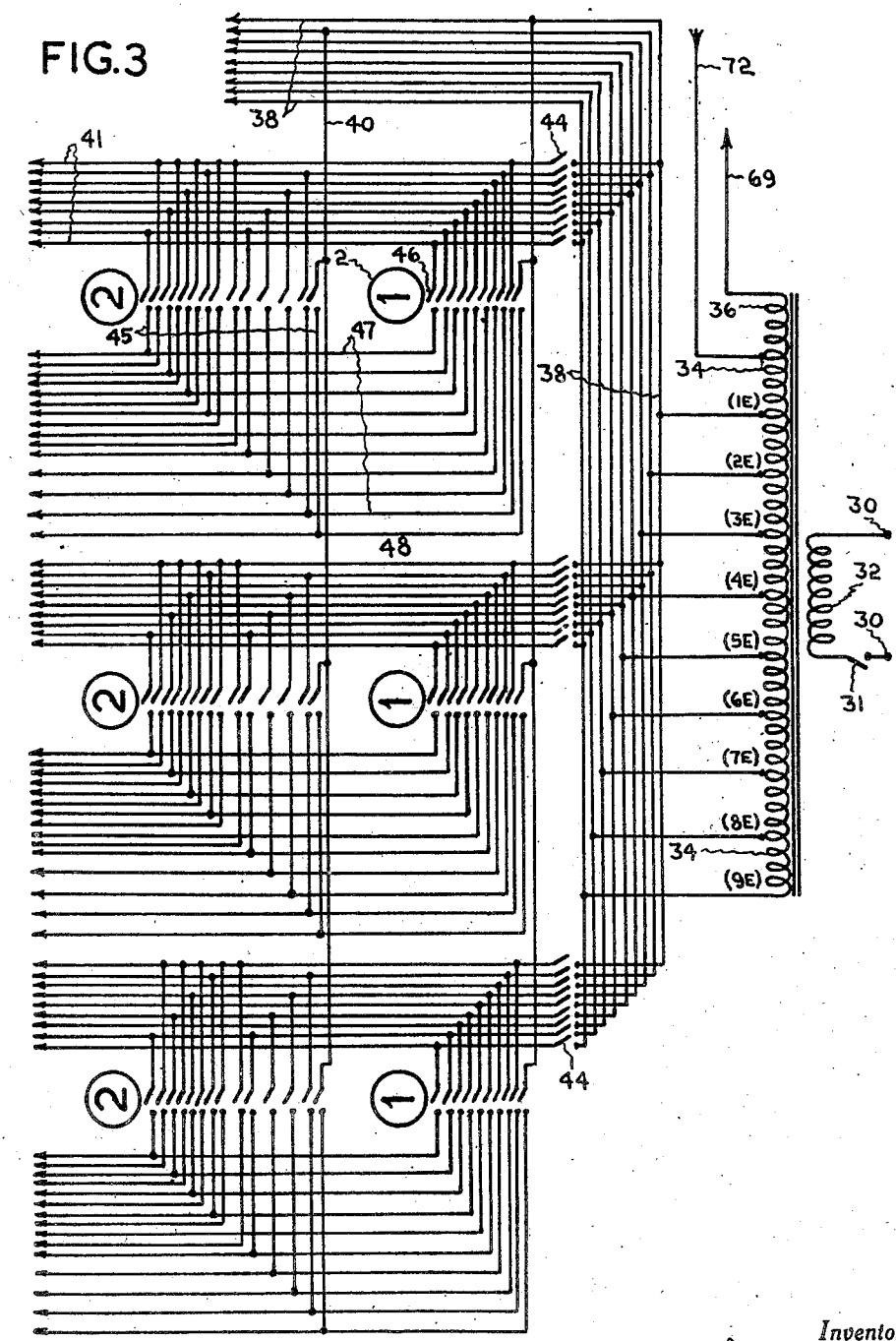
Figures 3, 4, 5, 6, 7, 8 and 9 show a general scheme of electrical connections.

A description of the preferred embodiment of the present invention will now follow, it being understood that the said embodiment represents only one of the many possible ways of putting the invention into a practical form. Although in the description distinction will be made between the functions of the multiplicand and the multiplier, it is to be understood that they are interchangeable terms used for convenience only. The designations of those parts of the machine which are repeated in groups of different decimal order, will be distinguished by suffixes 1, 10, 100 etc. In the schemes of electrical circuits the connections between the conductors will be indicated by dots at their points of junction or intersection. In the description reference will be made to "unit current" meaning thereby that current which corresponds to the digit 1, the real intensity of this unit current being conveniently only a small fraction of an ampere. In the numerical examples the current intensities will be given in these "unit currents" by a figure followed by the letter C, and enclosed by brackets. Resistances and voltages will be given in corresponding units by figures followed respectively by the letter R or E and enclosed by brackets. These values are chosen so that in a circuit of resistance (1R) a voltage (1E) produces a current (1C). Reference will be made in the text to partial products, meaning thereby the product of two single digits e. g. 7×4=28 is one of the partial products in the product 8077×349. In the partial products further distinction will be made between its units and tens digits, which in the given example are 8 and 2.

In the machine to be described, the multiplier is limited to three figures, the multiplicand to four figures, and the result to eight figures, it being understood that these limitations are adopted to simplify the description and the accompanying drawings and that the capacity of the keyboards and of the accumulator can be increased within reasonable limits to any desired value.

The plan view of the machine is shown in Figure 1. On the top of frame 1 are disposed three columns of multiplier keys 2 and four columns of multiplicand keys 3, the keys in each column being numbered from "1" to "9." To set the machine ready for automatic operation, the two factors are registered by depressing the appropriate keys, which remain in their depressed positions until released automatically at the end of the operations. Further, to correct mistakes which may be made while registering, a release key 4 is provided which when depressed releases such keys 3 and 4 as have been depressed.

At the back of the machine is a carriage 10 carrying a rubber cylinder 11, a paper roll, and all the other mechanisms for paper feed and guide. Numbers on the paper strip are printed by hammers acting on the eight type carrier racks 9. The carriage 10 can slide parallel to the axis of its cylinder 11 and its positions are determined by a tabulating mechanism.

The operation of automatic multiplication is started by depressing the multiplication key 5. During the operation the carriage moves first to the extreme right from its rest position, where the two factors are printed, this phase being called "factor cycle"; then the carriage moves to the left, where the product of the two factors is printed, this phase being called "product cycle"; then the carriage moves again back to its rest position where the sum of the said product to the number stored up in the accumulator during the previous operations is printed and at the same time registered in the accumulator, this phase being called the "sum cycle."

In Figure 2 is shown a portion of a paper strip, on which a numerical example has been printed by the machine. The upper number 82320 in column 23 has been printed and registered in the accumulator at the end of the previous operations. On the line below in columns 20 and 21 the two factors 349 and 8077 are printed during the factor cycle, their product 2,818,873 is printed in column 22 during the product cycle and finally the sum 2,901,193 is printed in column 23 during the sum cycle.

Other controls belonging to the machine are the addition key 6 (Figure 1) which causes to be printed and added to the accumulator an addendum registered on the multiplicand keyboard 3; the sub-total key 7, which causes the machine to print the number registered in the accumulator and the total key 8 which is for zeroising the accumulator while printing the number registered in it. Means are provided to lock all the keys in their respective positions during the operation of the machine.

The structure of frame 1 is such as to allow a good ventilation of the inside of the machine. Inside the machine, there is a small preferably universal motor connected to the mains, which carries a small fan to promote ventilation and the speed of which is regulated by an adjustable centrifugally operated switch. The motor is started by any of the control keys 5, 6, 7 and 8, and is stopped automatically at the end of the operations; it drives a shaft through reducing gear, conveniently worm gear on which is arranged a suitable number of one-revolution clutches carrying cams operating the bails and dogs to open and close switches, the selection of the appropriate one-revolution clutches in the suitable sequence being controlled partly by the control keys 5, 6, 7 and 8, and partly by the different positions of the carriage 10 acting through a tabulating mechanism. The motor further supplies the energy for the other movements.

The parts of the machine which are controlled by the motor are similar to those of the existing calculating machines and well known to those skilled in the art and therefore they will not be described in detail or shown in the accompanying drawings, but only referred to as much as necessary for the clearness of the description.

Figure 6:
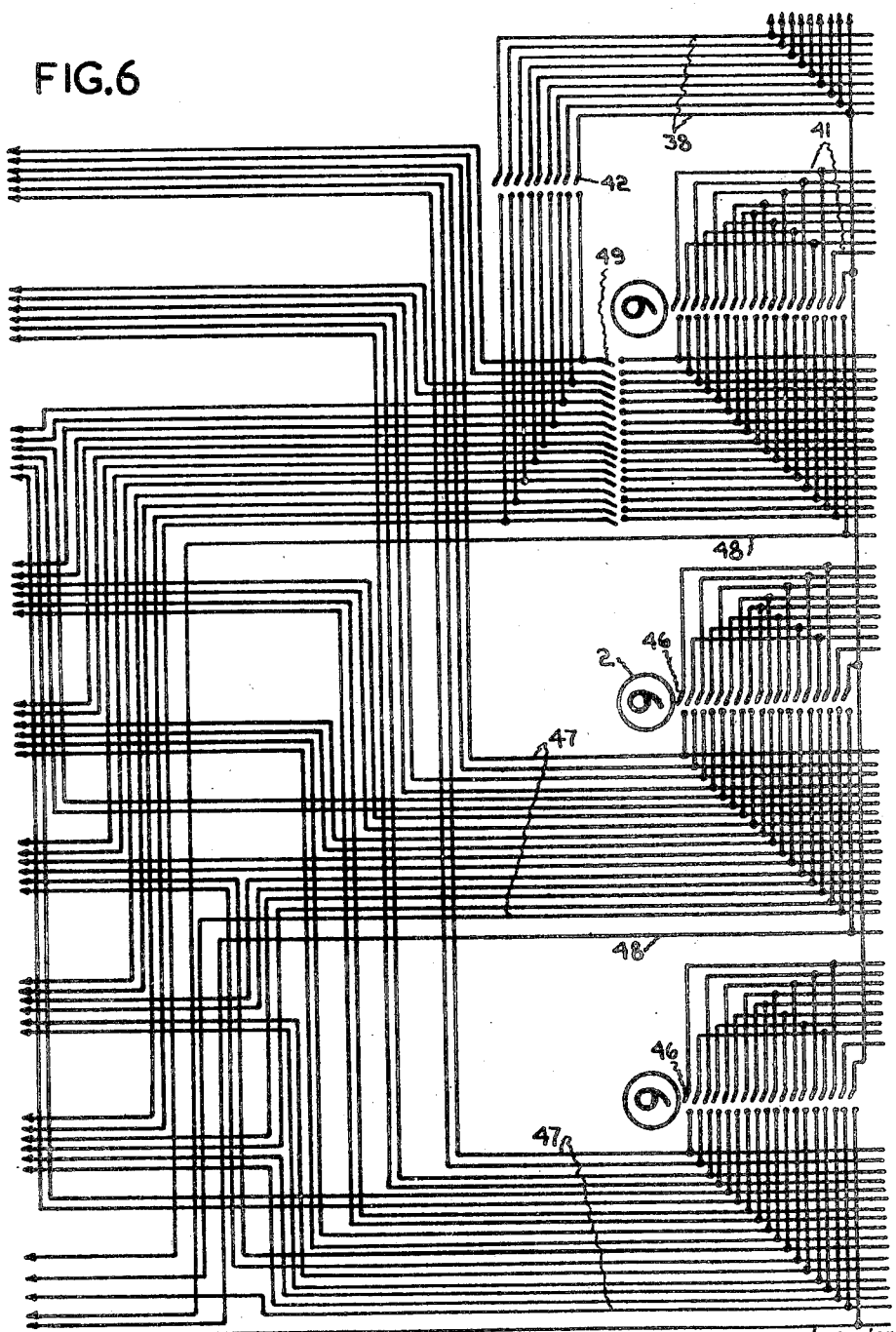
Figure 7:
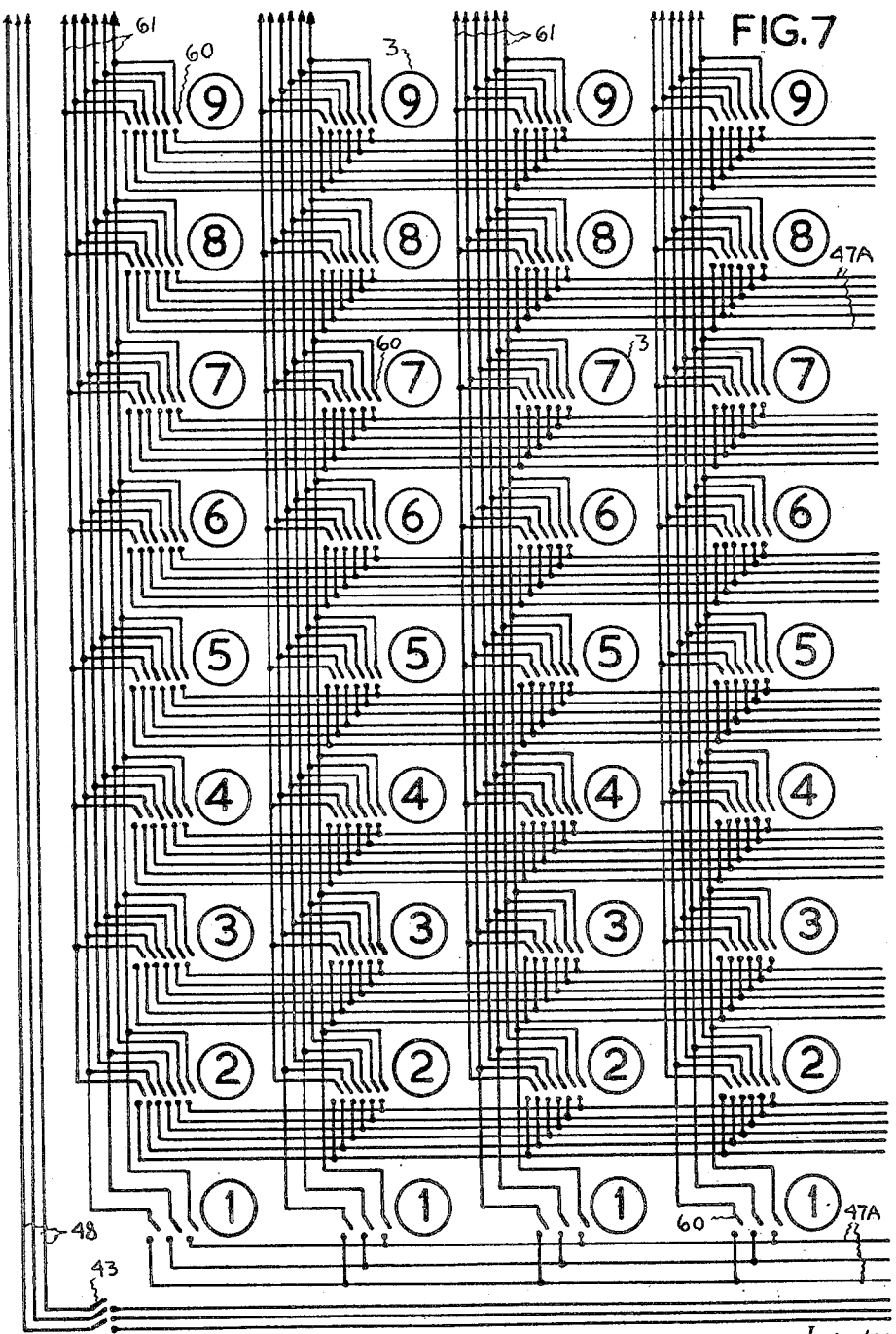
Figure 8:
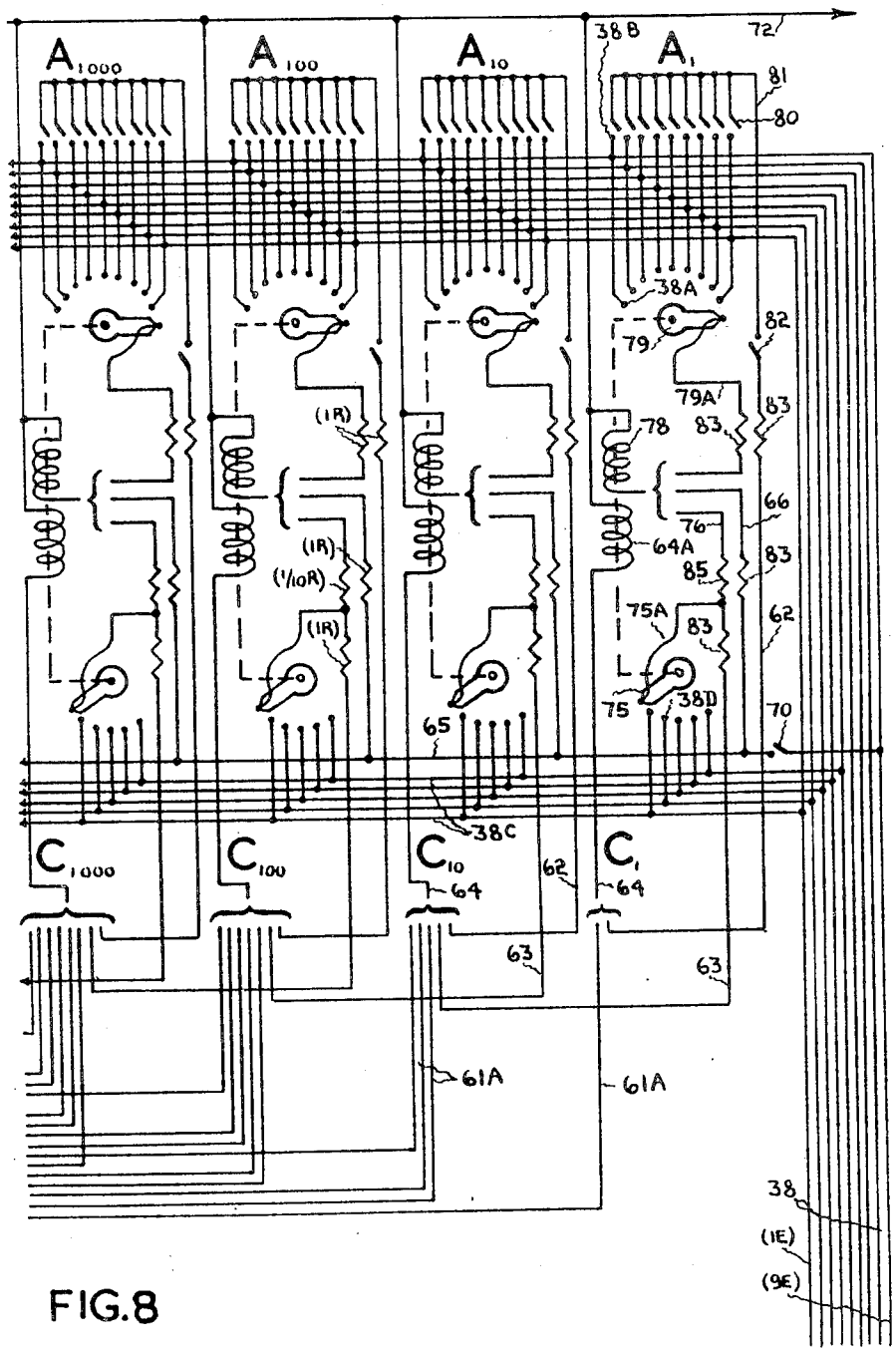
Figure 9:
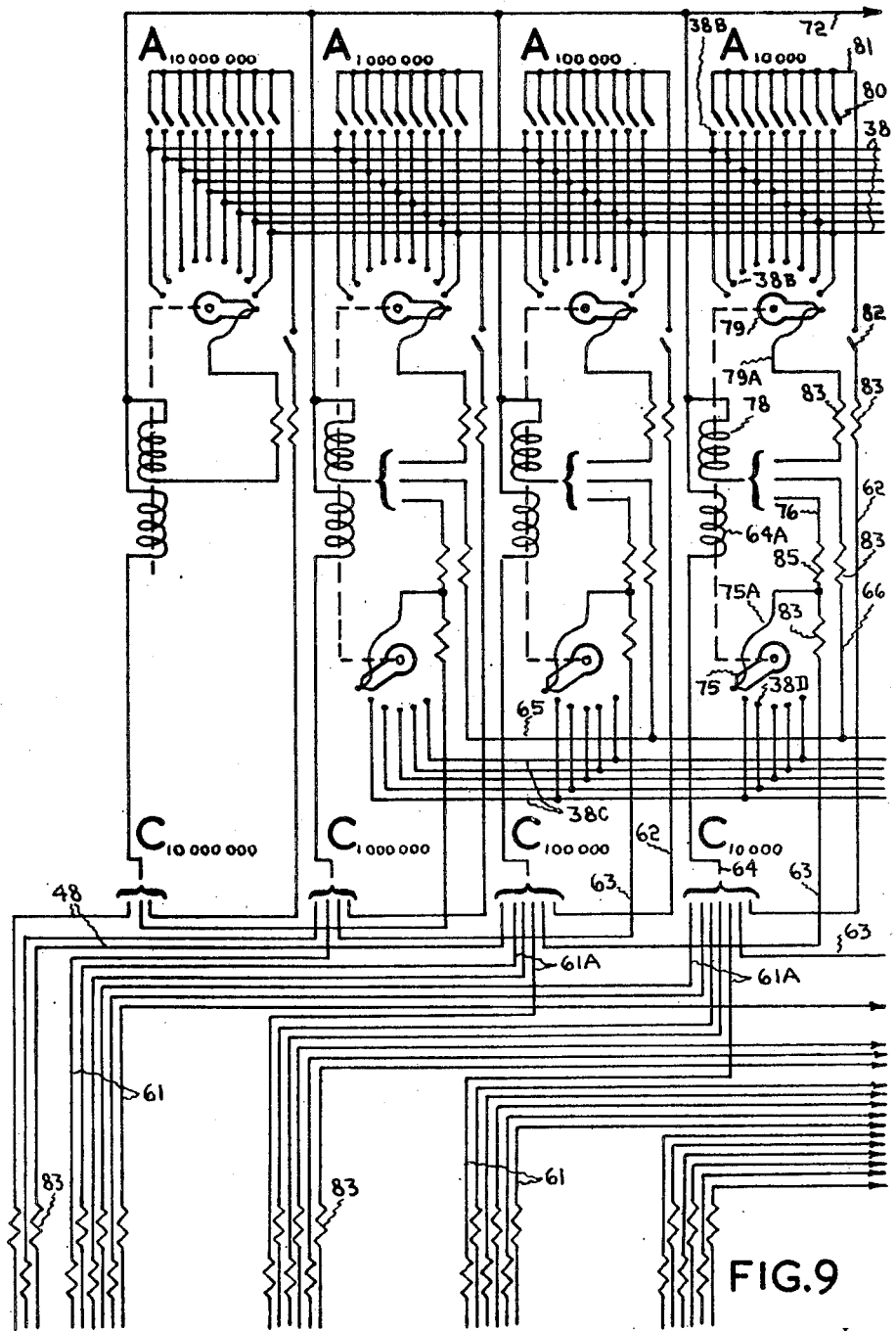

In Figures 3, 4, 5, 6, 7, 8 and 9 a scheme of the electrical connections of the calculating circuits is shown, where Figures 3, 4, 5, 6 and 7 should be viewed each placed to the right of the next higher figure, and Figures 9 and 8 placed above Figures 7 and 6 respectively. In these figures the multiplier keyboard is shown turned anticlockwise by 90° for the sake of increasing the clearness of the diagram.

In Figure 3 the alternating current mains are connected through the terminals 30 and switch 31 to the primary windings 32 of an iron-cored transformer 33. The secondary side consists of the stepped windings 34 and windings 36. One of the secondary terminals is connected to a common return conductor 72.

The stepped transformer is designed so as to form voltage sources from (1E) to (9E) by steps of (1E) and it follows that the transformer injects into the parallel circuits which have a resistance (1R) and are connected to them at the appropriate times, corresponding current intensities from (1C) to (9C). The transformer 36 supplies current to the armature coils 210, Figure 35, of the counter through conductors 69, Figures 3 and 32.

The transformer is built in a well ventilated container separate from the machine itself, and placed at a convenient distance from it.

The function of the multiplier keys 2, and multiplicand keys 3 is that of connecting the circuits of the counters to that step of the transformer which supplies the current required for the particular operation.

The terminals of the stepped transformer are connected to conductors 38 Figures 3, 4, 5, and 9. To conductors 38 are connected three conductor systems 41, Figures 3, 4, 5, and 6, through switches 44. The conductors 41 which are alive in the product and sum cycles, branch away again into systems of conductors 45. Each system 45 contains a maximum of seventeen conductors and geometrically parallel to each of them runs one conductor of the system 40 branching off from conductors 38 which are alive in the factor cycle and are distributed in such a way that under the row of the keys "9" runs a conductor 40 which carries a voltage of (9E), the one under the row "8" a voltage of (8E) etc. The conductors 45 are connected to the conductors 41 according to a pattern which reproduces the multiplication table; e. g. in the conductors 45 passing under the key "7" the first conductor to the left is connected to that conductor 41 which when alive carries the voltage of (3E), the second from the left to that of (6E), the two currents representing thereby the unit digit "3" and the tens digit "6" of the partial product 7×9=63. Similarly, the third and fourth conductors can carry (6E) and (5E) representing 7×8=56 and so on, the 17th being able to carry (7E) corresponding to 7×1=7.

Each of the multiplier keys 2, when depressed, controls a switch 46 closing a maximum number of eighteen contacts, connecting thereby conductors 40 and 45 respectively to those 48 and 47, one system of conductors 47 and 48 running alongside each column of multiplier keys 2, and those belonging to the unit digits column passing through switches 49, open during the factor cycle and closed during the product and sum cycles. The system of conductors 38 is connected through switches 42 in the order shown to these conductors 48 of the unit digits column which are reserved to carry the unit digits of the partial products, these connections providing in the factor cycle for the multiplication of the multiplicand by one as will be shown later.

The system of conductors 38 carries currents which operate the counting apparatuses in Figures 8 and 9.

The conductors 48 are prolonged into Figure 7 where they pass through switches 43 and from there are shown to extend into Figure 9 entering there the three extreme left counting groups, causing thereby the printing mechanism to print during the factor cycle, the digits of the multiplier.

The conductor systems 47 lead into the multiplicand keyboard in Figure 7 where they are distributed in systems 47A as shown running under the rows of the multiplicand keys 3. The distribution is arranged in such a way, that conductors carrying voltages corresponding to those partial products in which one of the factors is nine pass under the row of the multiplicand keys "9," those corresponding to partial products in which one of the factors is eight pass under the row of the multiplicand keys "8" and so on. Each column of the multiplier keyboard contributes two conductors to the branches of the systems 47A, therefore in the case of the present machine each branch consists at most of six conductors.

The multiplicand keys 3, when depressed, close the contacts of switches 60 connecting the systems 47A to those 61 in the order shown in Figure 7, one branch of the conductor systems 61 running alongside each column of the multiplicand keyboard, in the case of the present machine each system 61 consisting of six conductors. By the effect of this arrangement in the conductors 61 currents can flow, the intensities of which are proportional to the units or tens digits of the partial products of each digit of the multiplicand with each digit of the multiplier.

The conductor systems 61 are continued in Figures 8 and 9 where they are redistributed as shown through resistances 83 of (1R) into systems 61A so as to lead the currents corresponding to the tens and units digits of the partial products into the counters $C_1$, $C_{10}$, $C_{100}$, etc. of the proper decimal place, leading the current corresponding to the units digit of the partial product resulting from the multiplication of the units digits of the two factors into $C_1$, the tens digit of the same partial product and the units digits of the partial products resulting from the multiplication of the tens digit of one factor with the units digit of the other factor into $C_{10}$, and so on.

Before the conductors 61A enter into the counters C, they are joined by the conductors 62 and 63. The continuation of these joined conductor systems is shown symbolically by the single lines 64, although in reality all these conductors remain insulated from each other till they reach the common return line 72; these conductors 64 are shown to pass through the coils 64A of the counters C.

The maximum total current which can enter any one of the counters C in the machine described is (52C). During the first phase of the operation, the counter detects whether the current carried by the conductors 64 is greater or not than (9C). If it is stronger than (9C) then the counter adds to it according to the necessity the amounts (−10C), (−20C) etc. up to (−50C) making thereby sure that during the second phase the total current in the counters C becomes always less than (10C) and at the same time adds corresponding amounts (1C), (2C) etc. up to (5C) to the counter of the next higher order through conductors 63. To obtain this result, the conductor system 38 in Figure 3 is shown extended into Figures 8 and 9 and its first five conductors carrying voltages from (1E) to (5E) are connected to those 38C which are shown to pass under the row of the rotating brushes 75 and being connected to terminals 38D disposed in a circle. The conductor 38 carrying the voltage (9E) is connected through switch 70 to conductors 65 which branch off into conductors 66 passing through the resistances 83, the switch 70 being closed during the first phase of the operations and open during the second phase. These conductors 66 lead together with 76 and 79A to the coils 78. These coils 78 are wound the opposite way to the coils 64A, and being wound on the same electromagnet their combined effect will be proportional to the difference of their current intensities. Therefore, for the purposes of calculation the current in the coils 78 and in all the other coils wound in the same direction will from now on be considered as negative, in the special case considered (—9C). These coils act on the rotating brushes 75 and 79 in such a way that negative and zero currents keep them steady in the zero position or in whatever other positions the brushes might have reached, whereas positive currents tend to move them step by step, connecting at each step different terminals 38A and 38D.

The brush 79 is connected to conductor 79A and brush 75 to conductor 75A. Conductor 75A branches off into conductors 63 and 76. Conductor 63 passes through resistance 83 of (1R) and into it are injected currents of intensity increasing at each step by (1C). Conductor 76 passes through resistance 85 of (1/10R) and into it are injected negative currents of intensity increasing at each step by (—10C), no currents being transmitted by the brushes 75 and 79 in their zero positions; e. g. if the current in 64A is (4C) then as the constant current in 78 is (—9C), their acting difference is (—5C), which being negative has no effect on the position of the brushes 75. But if the current in 64A is say (15C) then on the brushes 75 the total current (15C—9C)=(6C) acts moving it by one step and so injecting (—10C) into 78 and (1C) into 63, changing the total currents in coils 64A, and 78 into (15C—9C—10C)=(—4C), which keeps the brush 75 in the position reached after the first step.

During the first phase of the operation, the brushes 79 are kept in their initial positions by mechanical means, the switch 70 is closed and brushes 75 are free to move, until the total current in coils 64A and 78 becomes zero or negative. In the second phase, the brushes 79 become free to move, the switch 70 is open and brushes 75 are prevented by mechanical means from any further movement. At this point the total current in its coils can only be either positive or zero, and is always less than (10C). The action of the coils 64A and 78 on the brush 79 is that of moving the latter step by step as long as the total current in the coils of the counter remains positive, each step increasing the current in 78 by (—1C), the movement of the brush 79 being stopped when the currents in 64A and 78 balance each other. If the total current at the beginning of the second phase is zero, then the brush 79 remains in its initial position; if e. g. the total current at the beginning of the second phase is (7C), then the brush 79 is moved step by step connecting one after another the terminals 38A to conductor 79A and coil 78, increasing at each step the current flowing in it by (—1C) until after seven steps the current becomes (—7C) which makes the total current in the coils zero, and makes the brush stop in that position.

In this way the number of steps made by the brush 79 equals the corresponding digit of the result. Mechanical connections to be described later cause a type carrier rack 9, Figures 1 and 36, to move the same number of steps until the corresponding type is brought into line with the printing hammers, which then, when striking, print the digits of the product on the paper strip.

The accumulator A, Figures 8 and 9, is for storing up the results obtained by the machine. Each of the accumulator groups $A_1$, $A_{10}$, $A_{100}$, . . . contains nine switches 80. The switches 80 are independent of each other, they can be moved by mechanical means from the open to the closed positions, and they are kept steady in either of these positions by spring retainers. Only one of the switches 80 is closed in each group at one time and the switch closed corresponds to the digit registered in that group; if the registered digit is nought, all the switches are open. The switches 80 can connect any of the terminals 38B to the conductors 81, which latter are then connected through switches 82 to conductors 62 and 64.

During the factor and product cycles, the switches 82 are open but they are closed during the sum cycle, adding therefore to the currents already flowing in 64, additional currents corresponding to the digits registered in the accumulator, the number indicated in the counters becoming thereby the sum of the product of the two factors registered on the keyboards, and the number registered in the accumulator.

Towards the end of the sum cycle, the brushes 79 are held by mechanical means in the positions they have reached, and the main current switched off at 31, Figure 3; mechanical means are provided to open at this point first all the switches 80 of the accumulator to cancel the number registered in it and then to close those switches which correspond to the positions of the brushes 79, to register the new result in it.

Mechanical means are provided to bring back the brushes 75 and 79 into their initial positions and to release the depressed keys 2 and 3 at the end of the operations.

Having described the general scheme of the electrical connections, the manner in which it functions will now be illustrated by a numerical example. The example chosen is that shown printed in Figure 2, i. e. the operation:

$$8,077 \times 349 + 82,320 = 2,818,873 + 82,320 = 2,901,193$$

where the number 82,320 has been previously registered in the accumulator. In the drawings illustrating this example, the depressed keys are shaded, the conductors carrying currents are indicated by thick lines, and their voltages and current intensities by figures placed alongside of them, the voltage drop in the conductors outside the resistances being considered negligible.

Figure 13:
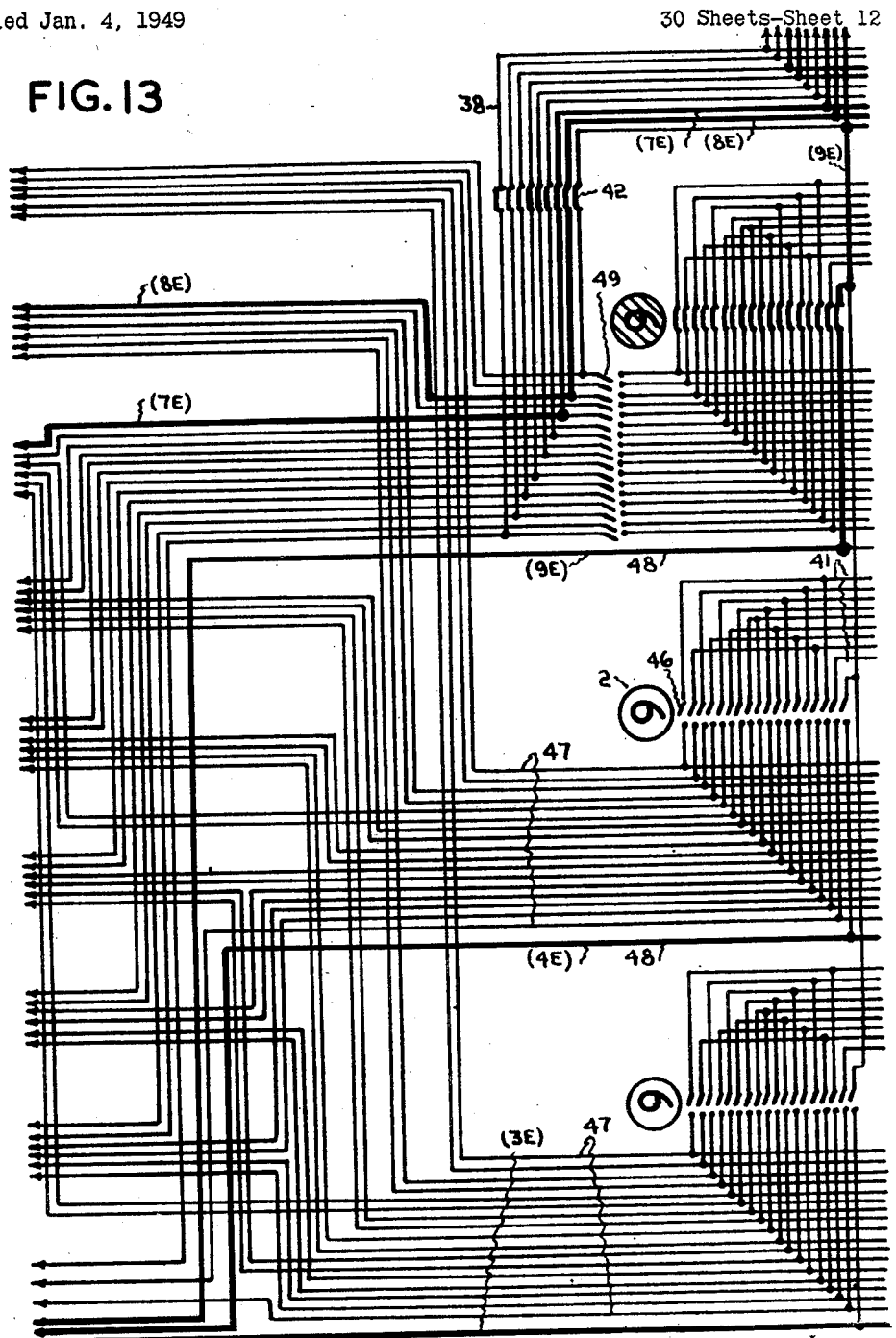
Figure 14:
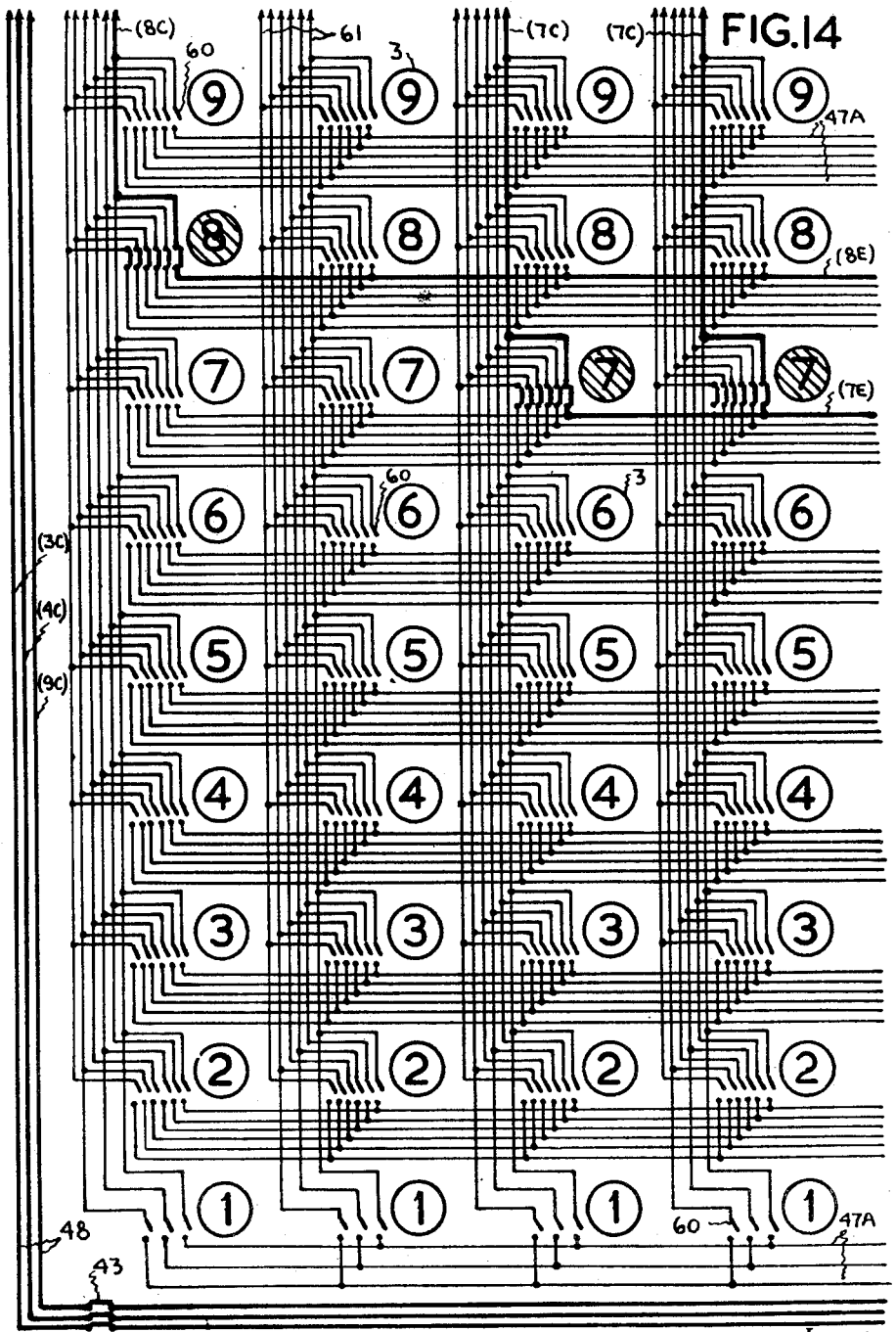
Figure 15:
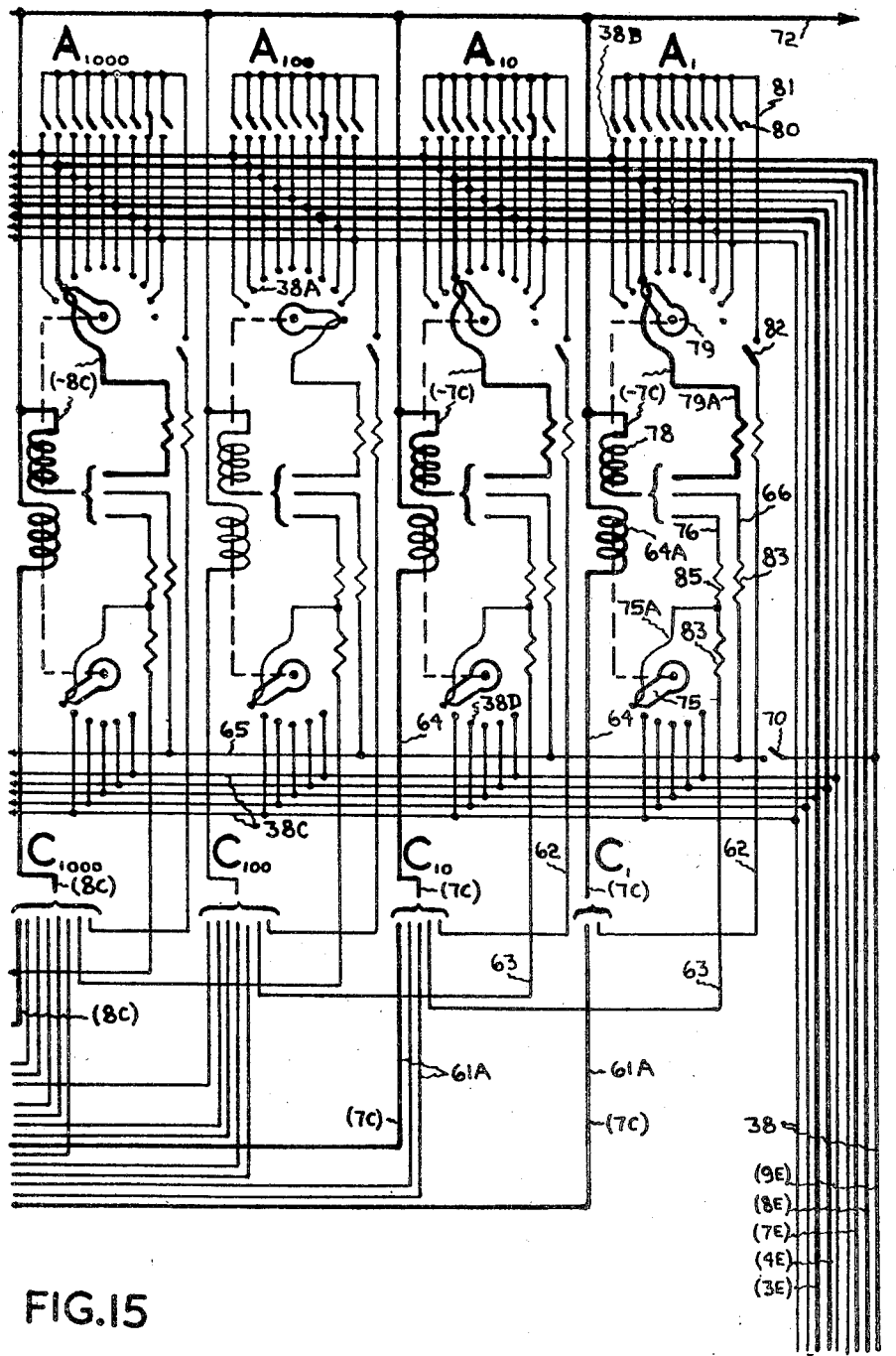
Figure 16:
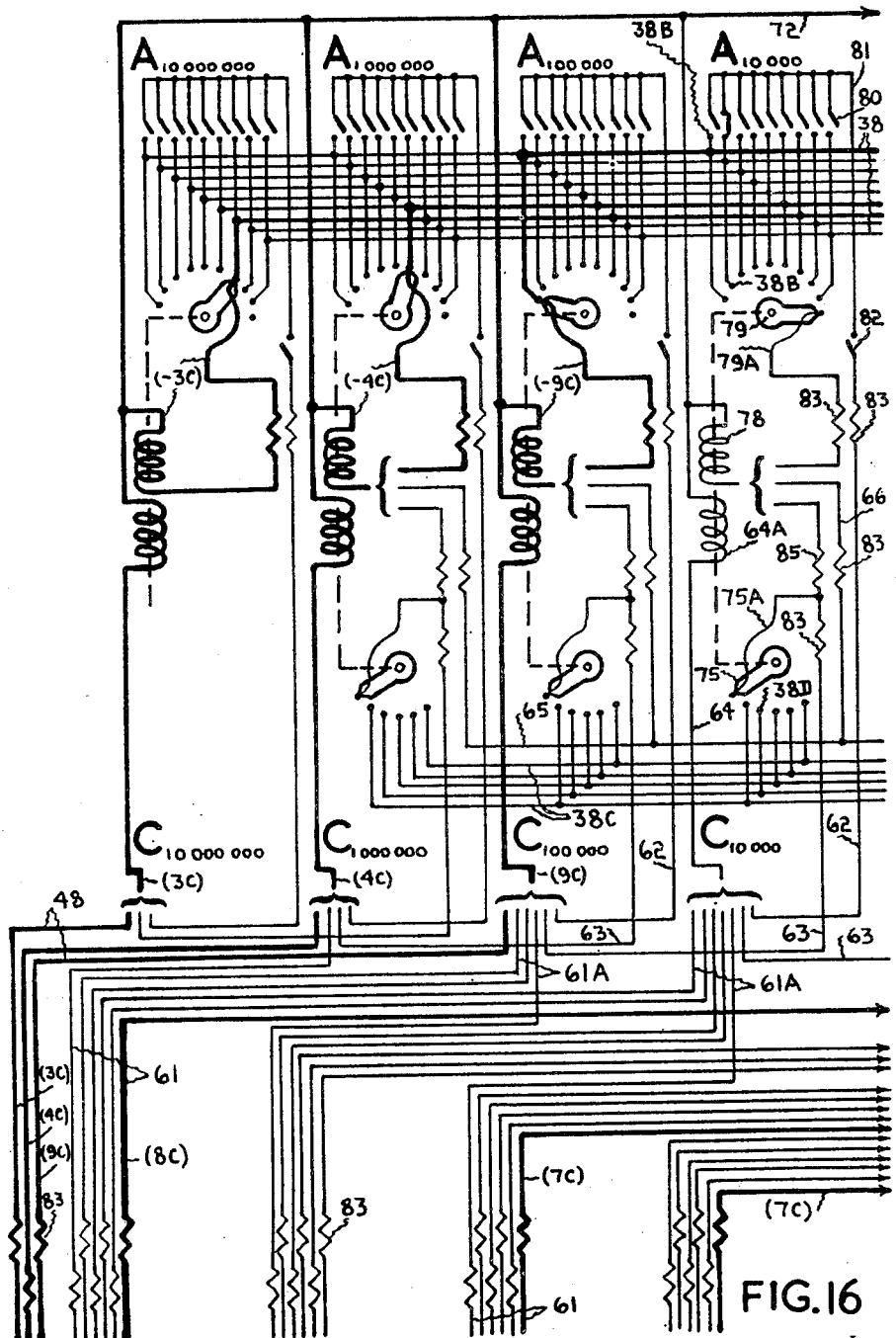

The functioning of the scheme during the factor cycle and at the moment of printing is shown in Figures 10, 11, 12, 13, 14, 15 and 16 where again Figures 10, 11, 12, 13 and 14 should be viewed each placed to the right of the next higher figure and Figures 15 and 16 placed above Figures 13 and 14.

Depression of keys 2 and 3 close their switches 46 and 60. During this cycle, the switches 31, Figure 10, 42, Figures 13, and 43, Figure 14, are closed, and switches 44, Figure 10, 49, Figure 13, 70 and 82, Figures 15 and 16, are open and the brushes 75 are held in their initial positions by mechanical means. It can be seen in Figures 10, 11, 12 and 13 how the depressed multiplier keys select the voltages (9E), (4E), (3E) and distribute them by the way of conductors 40, 48 and 64, Figure 16, into the respective counters $C_{100,000}$, $C_{1,000,000}$ and $C_{10,000,000}$. The coils 64A act upon the brushes 79 in the manner described, until the currents passing through conductors 38, terminals 38A, brushes 79, conductors 79A and coils 78 balance the currents flowing in coils 64A moving thereby during this process $79_{100,000}$ by nine steps, $79_{1,000,000}$ by four steps and $79_{10,000,000}$ by three steps, moving at the same time the connected type carrier racks 9 until the types "9," "4" and "3" are in front of the printing hammers. When these movements are ended, the hammers strike and the multiplier 349 is printed on the paper strip.

The multiplicand is printed at the same time in a similar way. The conductors 38, Figure 13, through switches 42 are connected to conductors 47 and 47A, Figure 14, of which the multiplicand keys "7" and "8" select those latter conductors which carry the voltages (7E) and (8E) directing them into conductors 61. The effect of this arrangement is equivalent to the multiplication of the multiplicand 8077 by 1.

The currents in conductors 61 are redistributed into conductors 61A, Figure 15, and from there enter into the counters $C_1$, $C_{10}$ and $C_{1,000}$ by way of the conductors 64, and coils 64A, setting the brushes 79 into motion in the manner described, until the currents in 78 balance those in 64A. By this time, brushes $79_1$ and $79_{10}$ have made seven steps and $79_{1,000}$ eight steps, controlling the movements of the corresponding type carrier racks 9 and allowing the multiplicand 8077 to be printed at the same time as the multiplier 349.

Figure 10:
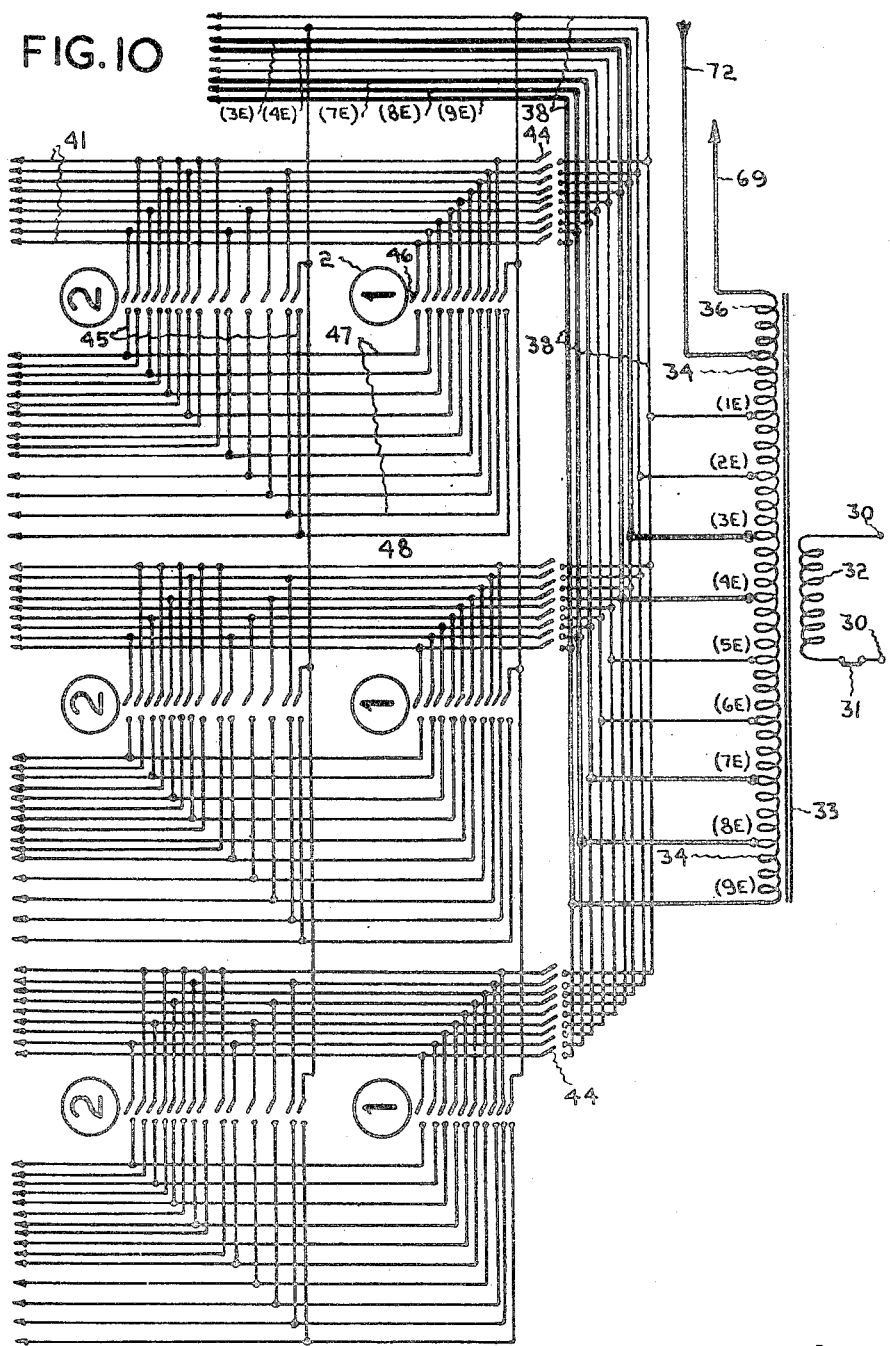
Figures 10, 11, 12, 13, 14, 15 and 16 show a scheme of electrical connections with the help of a numerical example during the "factor cycle."
Figure 11:
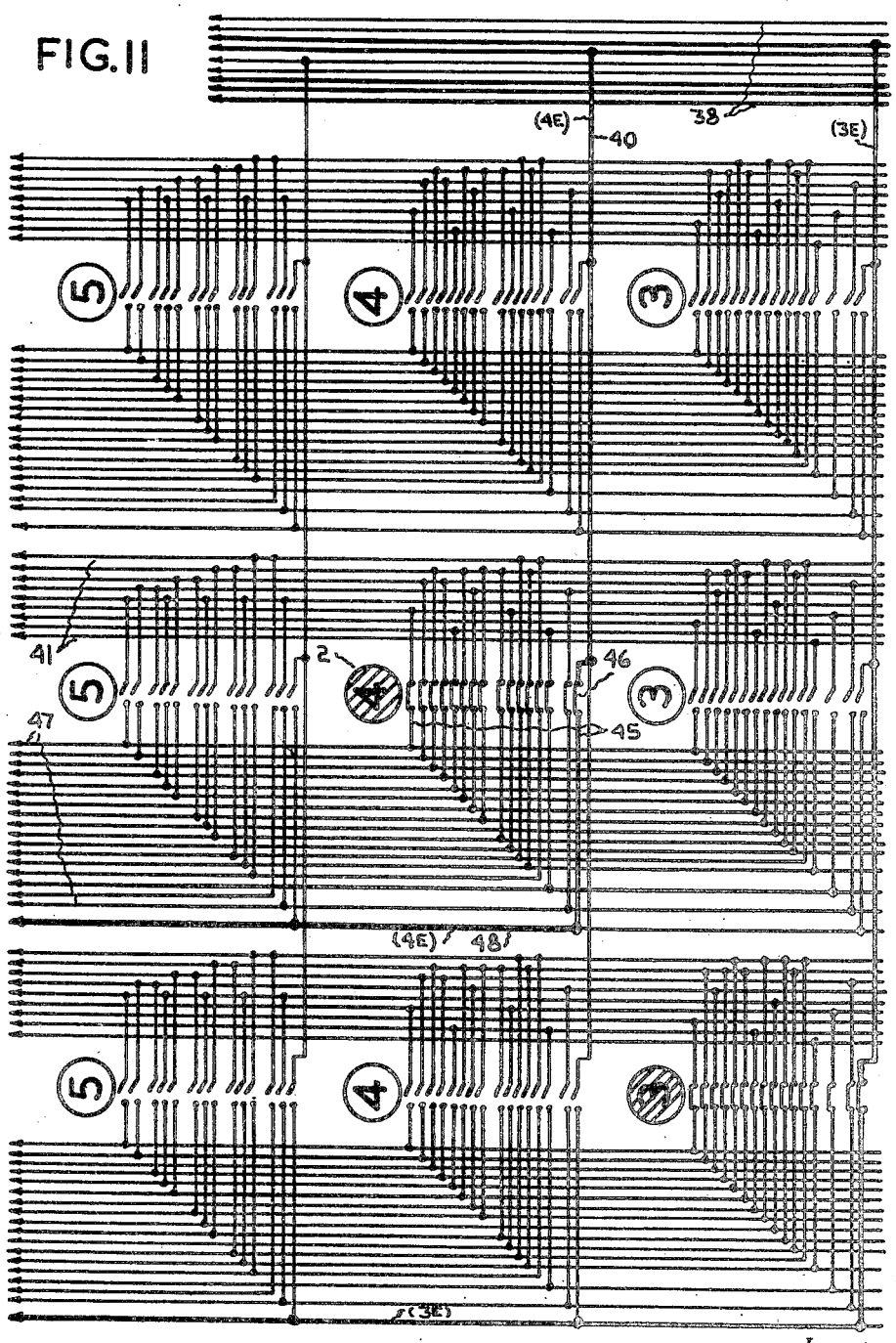
Figure 12:
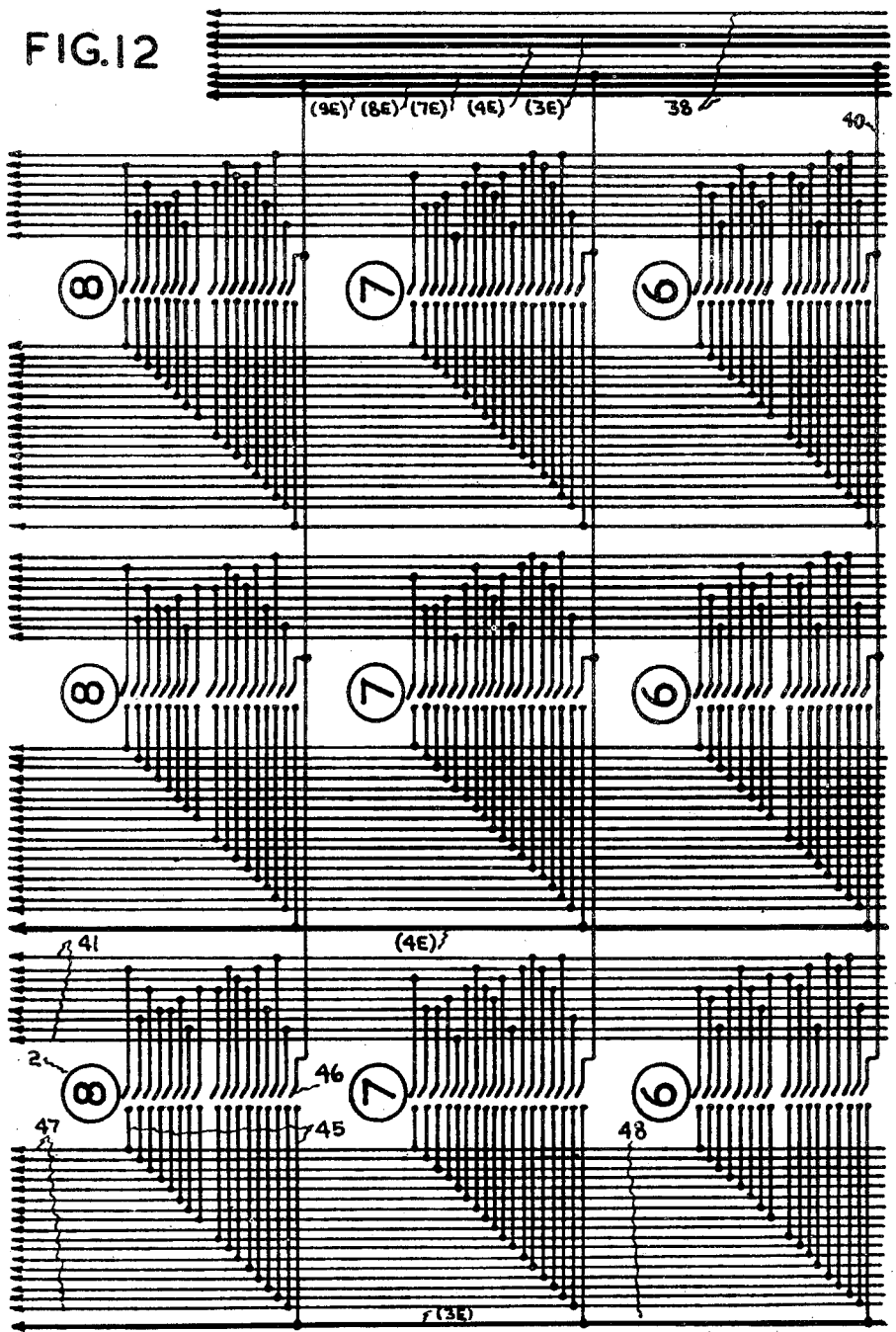

Just before printing, the type carrier racks 9 are held, and the current in the system is switched off by opening switch 31, Figure 10; after printing, the type carrier racks and the connected brushes 79 are brought back into their initial positions by mechanical means controlled by the motor.

Figure 17:
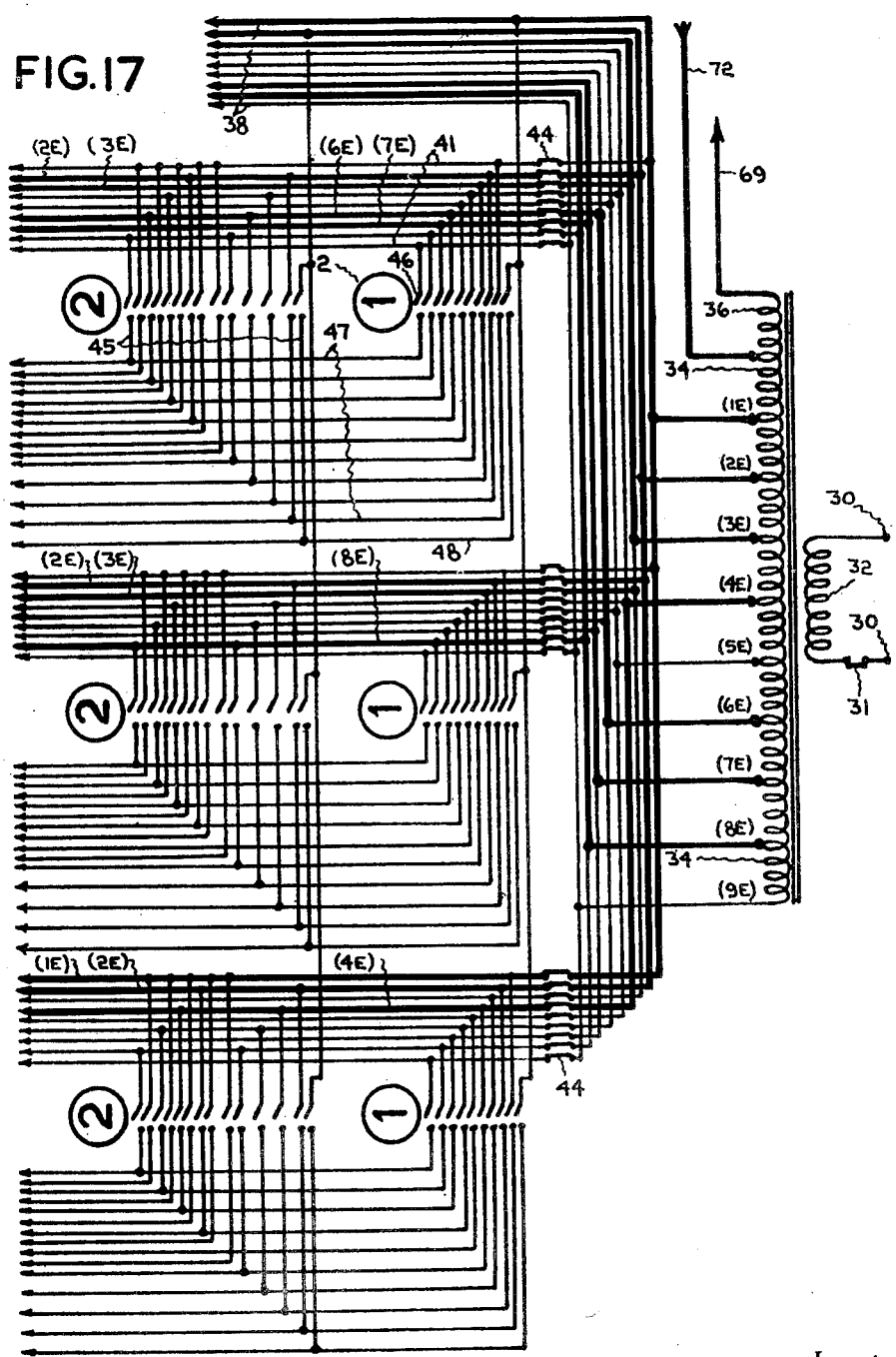
Figures 17, 18, 19, 20, 21, 22 and 23 show a scheme of electrical connections with the help of a numerical example during the "product cycle."
Figure 18:
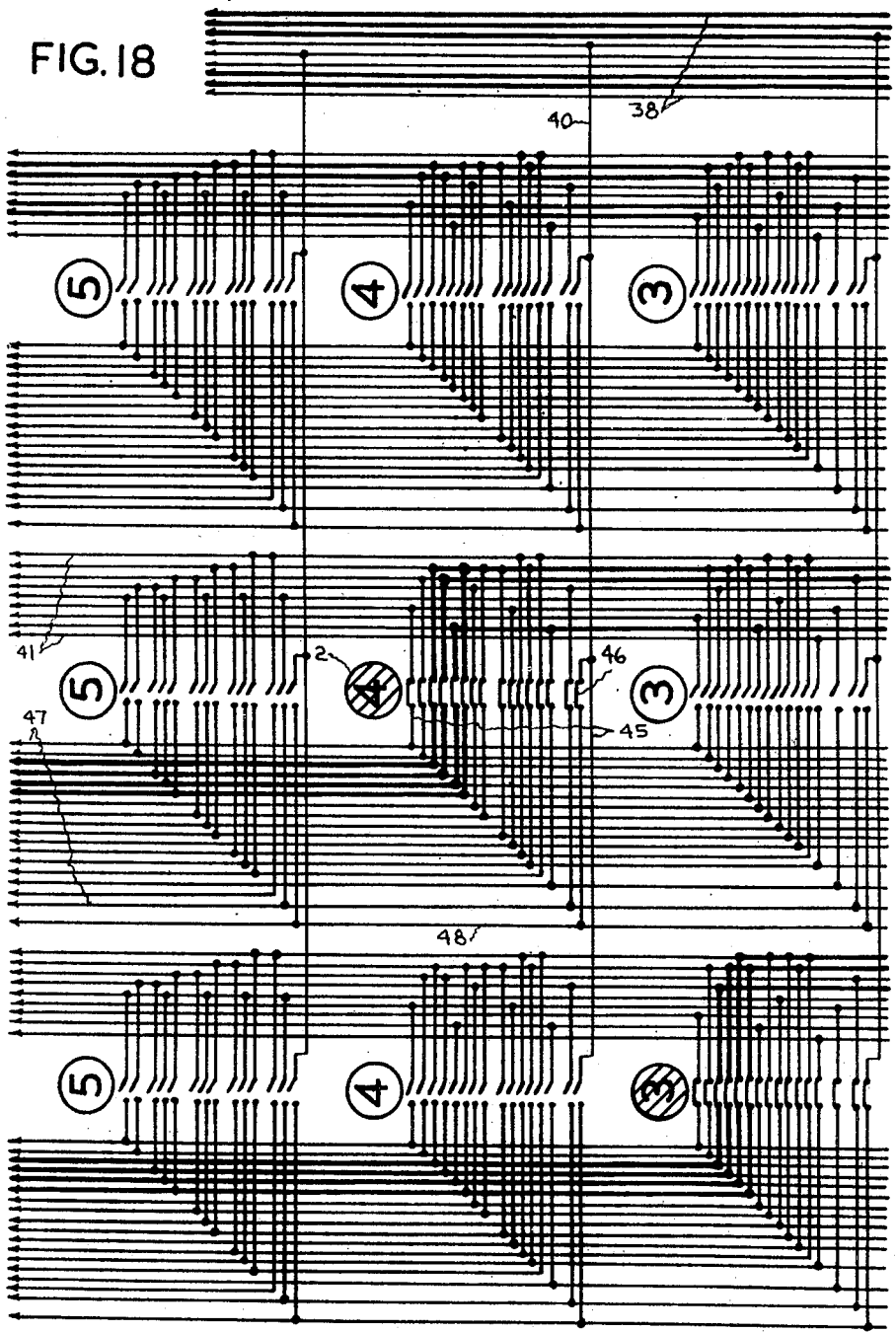
Figure 19:
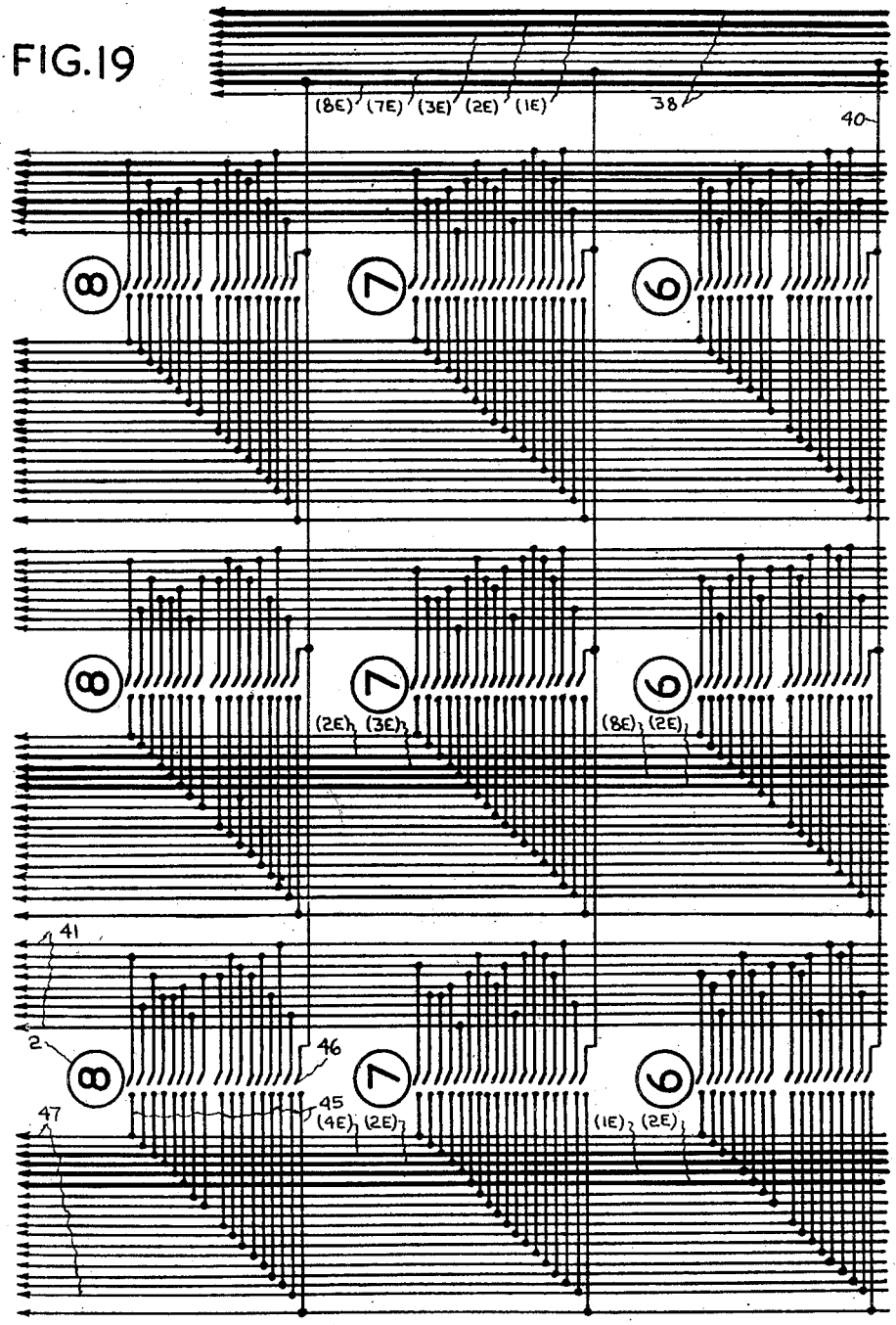
Figure 20:
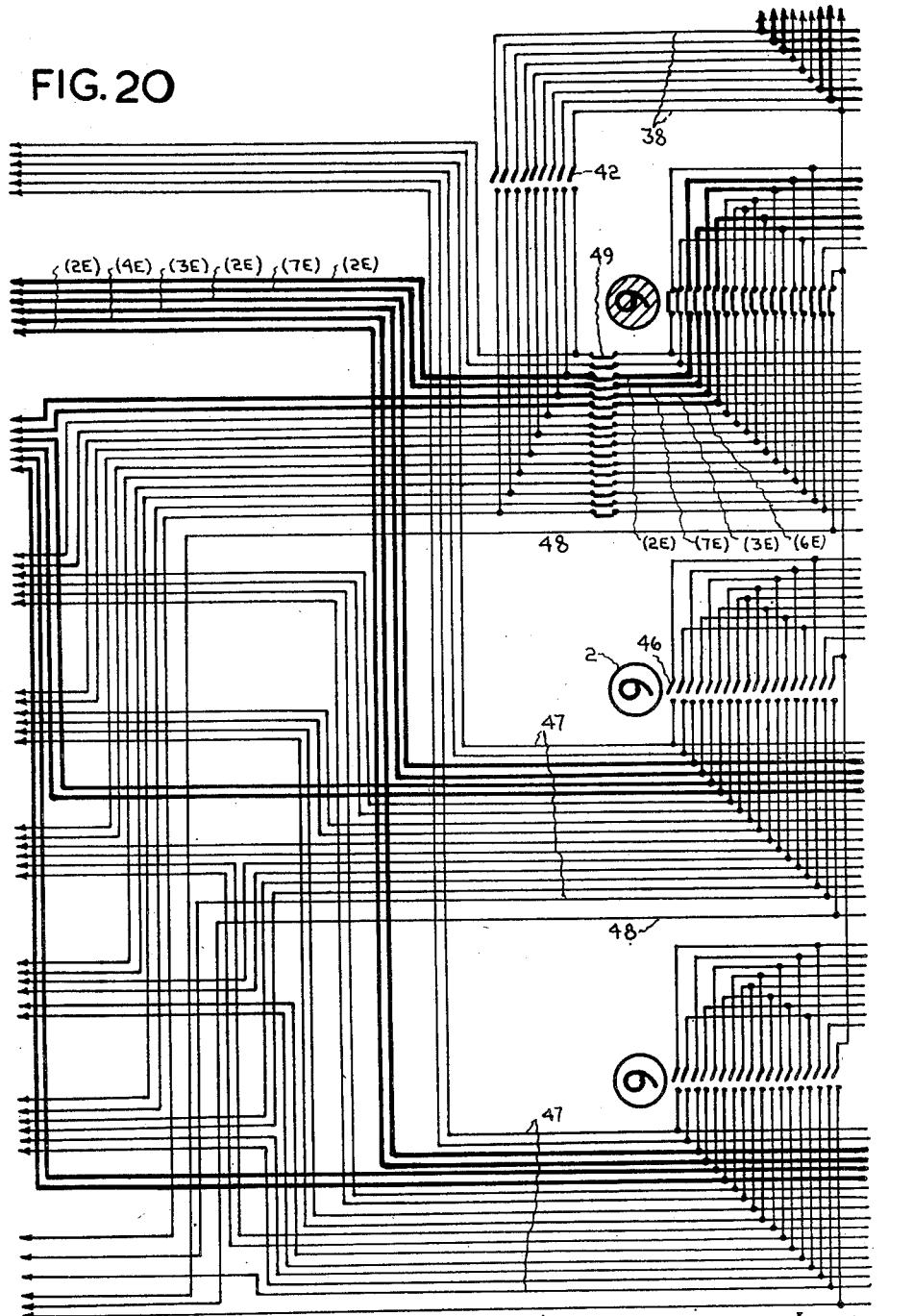
Figure 21:
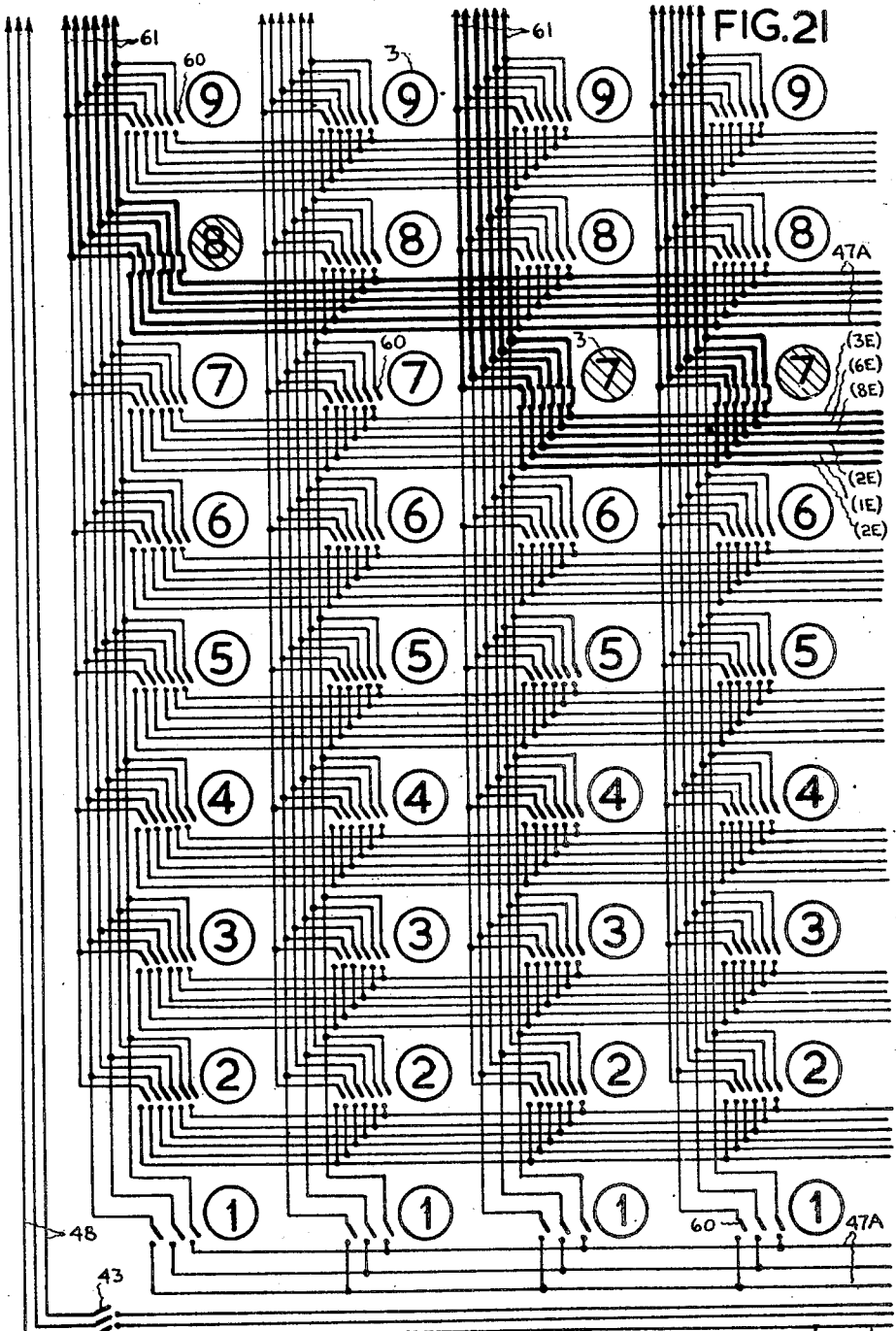
Figure 22:
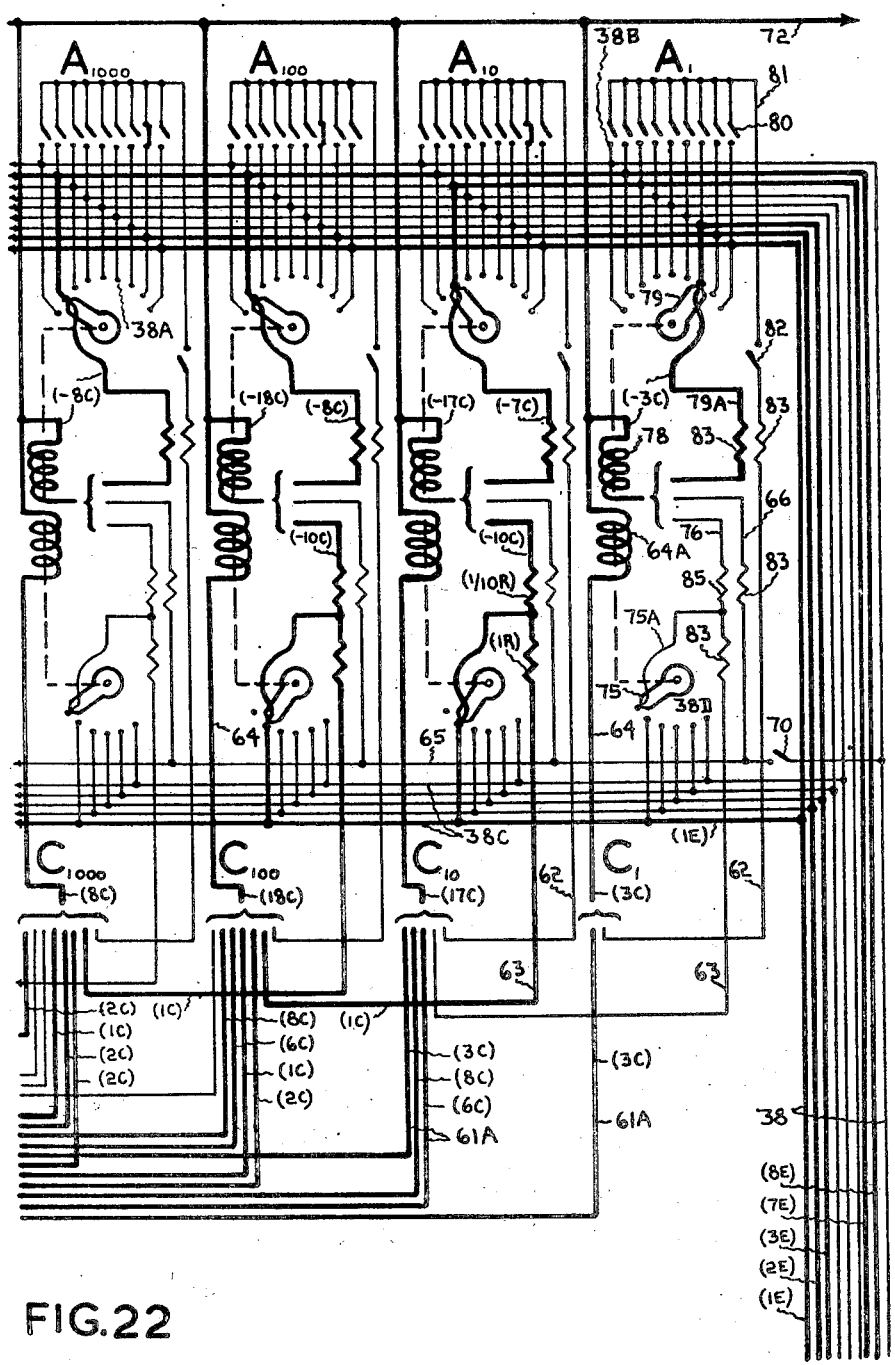

The product cycle will not be described. The functioning of the scheme at the moment of printing is shown in Figures 17, 18, 19, 20, 21, 22 and 23 where again Figures 17, 18, 19, 20 and 21 should be viewed each placed to the right of the next higher figure and Figures 22 and 23 placed above Figures 20 and 21. Additional to the switches closed by the depressed keys, the switches 31, 44, Figures 17, and 49, Figure 20, are closed and switches 42, Figure 20, and 43, Figure 21, and 82, Figures 22 and 23, are open; further the switch 70, Figure 22, is closed during the first phase of the operation and open in the second phase. In the first phase brushes 75 are free and those 79 locked in their initial positions. In the second phase, brushes 75 are locked in the positions they reached at the end of the first phase, and brushes 79 are free.

In consequence of the pattern of connections between the conductor systems 41 and 45, Figures 17, 18, 19 and 20, and the combined selective actions of the switches 46 and 60 of the multiplier and multiplicand keys 2 and 3, the 3rd, 4th, 5th and 6th conductors of $47_1$ (counted starting from above) carry the voltages (2E), (7E), (3E) and (6E) corresponding to the partial products $9 \times 8 = 72$, and $9 \times 7 = 63$; the same conductors of $47_{10}$ carry (2E), (3E), (8E) and (2E) corresponding to $4 \times 8 = 32$ and $4 \times 7 = 28$; and the same conductors of $47_{100}$ carry (4E), (2E), (1E) and (2E) corresponding to $3 \times 8 = 24$, and $3 \times 7 = 21$. These voltages are redistributed in systems 47A, Figure 21, so that conductors $47A_8$ (counted starting from above) carry (2E), (7E), (2E), (3E), (4E) and (2E), and $47A_7$ carry (3E), (6E), (8E), (2E), (1E) and (2E). These voltages are redistributed by the effect of the multiplicand keys 3 in systems 61 so that conductors $61_1$ and $61_{10}$ (counted from right to left) carry the currents (3C), (6C), (8C), (2C), (1C) and (2C) corresponding to $7 \times 9 = 63$, $7 \times 4 = 28$ and $7 \times 3 = 21$, and $61_{1000}$ carry (2C), (7C), (2C), (3C), (4C) and (2C) corresponding to $8 \times 9 = 72$, $8 \times 4 = 32$ and $8 \times 3 = 24$. These currents are again redistributed in systems 61A, Figures 22 and 23, so that (counting again from right to left) $61A_1$ carries (3C), $61A_{10}$ carries (6C), (8C), (3C), $61A_{100}$ carries (2C), (1C), (6C), (8C), (0C), $61A_{1,000}$ carries (2C), (2C), (1C), (0C), (0C), (2C), $61A_{10,000}$ carries (2C), (0C), (0C), (7C), (2C), $61A_{100,000}$ carries (0C), (0C), (3C), (4C) and $61A_{1,000,000}$ carries (2C), corresponding to the distribution of the digits in the partial products of the example considered, according to the scheme:

```
      8077 ×
       349
      ────
        63
       63
      00
      72
       28
       28
      00
      32
      21
      21
      00
     24
      ──────
         3
        17
        17
         7
        11
         7
         2
      ──────
     2818873
```

The current (3C) and $61A_1$ when combined with the current (−9C) in 66 during the first phase gives a total current of (−6C) which being negative does not act on brush $75_1$. In the second phase, the same current (3C) causes brush 79 to move by three steps.

The currents in $64_{10}$ sum up to (17C) which in $C_{10}$ together with (−9C) in $66_{10}$ give a total current of (8C) causing $75_{10}$ to move by one step, thereby injecting (−10C) into 76 and 78, so that now the effect of the brush $75_{10}$ becomes that corresponding to a total current $$(-9C + 17C - 10C) = (-2C)$$

which being negative has no further effect on $75_{10}$. In the second phase, the current (−10C) remains added to (17C) and the current (−9C) in $66_{10}$ removed by the opening of switch 70, producing in $64A_{10}$ and $78_{10}$ an effect corresponding to (7C) and moving the brush $79_{10}$ by seven steps.

After its first step, the brush $75_{10}$ injects further another current of (1C) into $63_{10}$ which joins the branch system $61A_{100}$, making the total current in $64_{100}$ equal to $(17C + 1C) = (18C)$, which acts on brush $75_{100}$ moving it by one step, reducing the current entering $C_{100}$ to (8C) which is registered by $79_{100}$ and adding by way of $63_{100}$ (1C) to $61A_{1,000}$ The total current in $64_{1,000}$ entering $C_{1,000}$ now becomes $(7C + 1C) = (8C)$ which latter current is registered by $79_{1,000}$.

The total current in $64_{10,000}$ entering $C_{10,000}$ is (11C) to which (−1CC) is added making the current entering $C_{10,000}$ equal to $(1C)$; at the same time $(1C)$ is added to the currents in $61A_{100,000}$.

The total current entering $C_{100,000}$ becomes thus $(7C+1C)=(8C)$ and that entering $C_{1,000,000}$ is $(2C)$.

In this way the product 2,818,873 of the two factors is registered in the counters C by the movements of the brushes 79, and printed in the way already described, after which, brushes 75 and 79 are again brought back into their initial positions.

Figure 23:
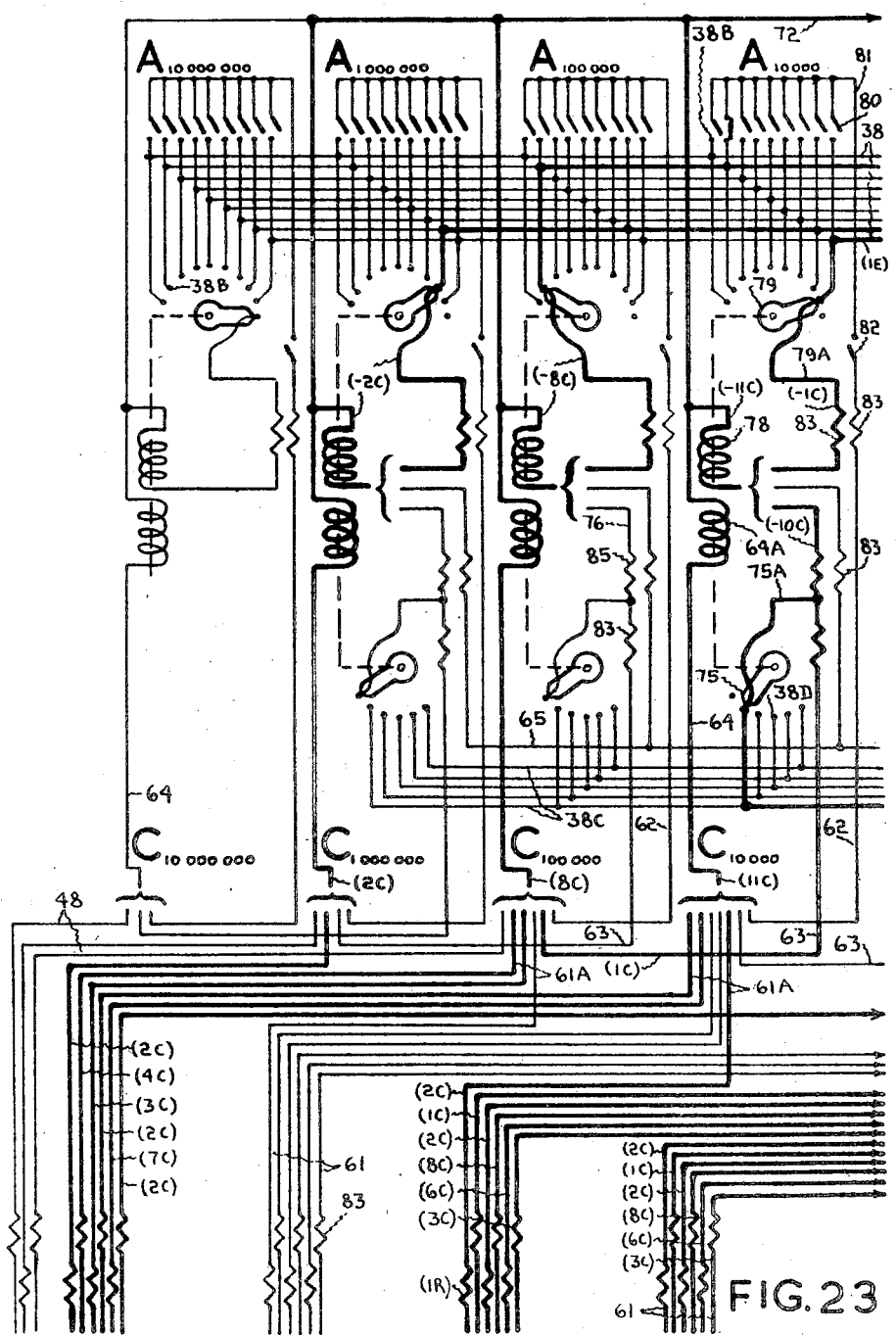

The sum cycle will now be described. The connections already shown during the product cycle in Figures 17, 18, 19, 20 and 21 remain identical during the sum cycle, but those shown in Figures 22 and 23 are replaced by the ones in Figures 24 and 25. Therefore, the complete scheme of this cycle is shown by Figures 17, 18, 19, 20, 21, 24 and 25, Figures 24 and 25 being viewed placed above Figures 20 and 21.

Figure 24:
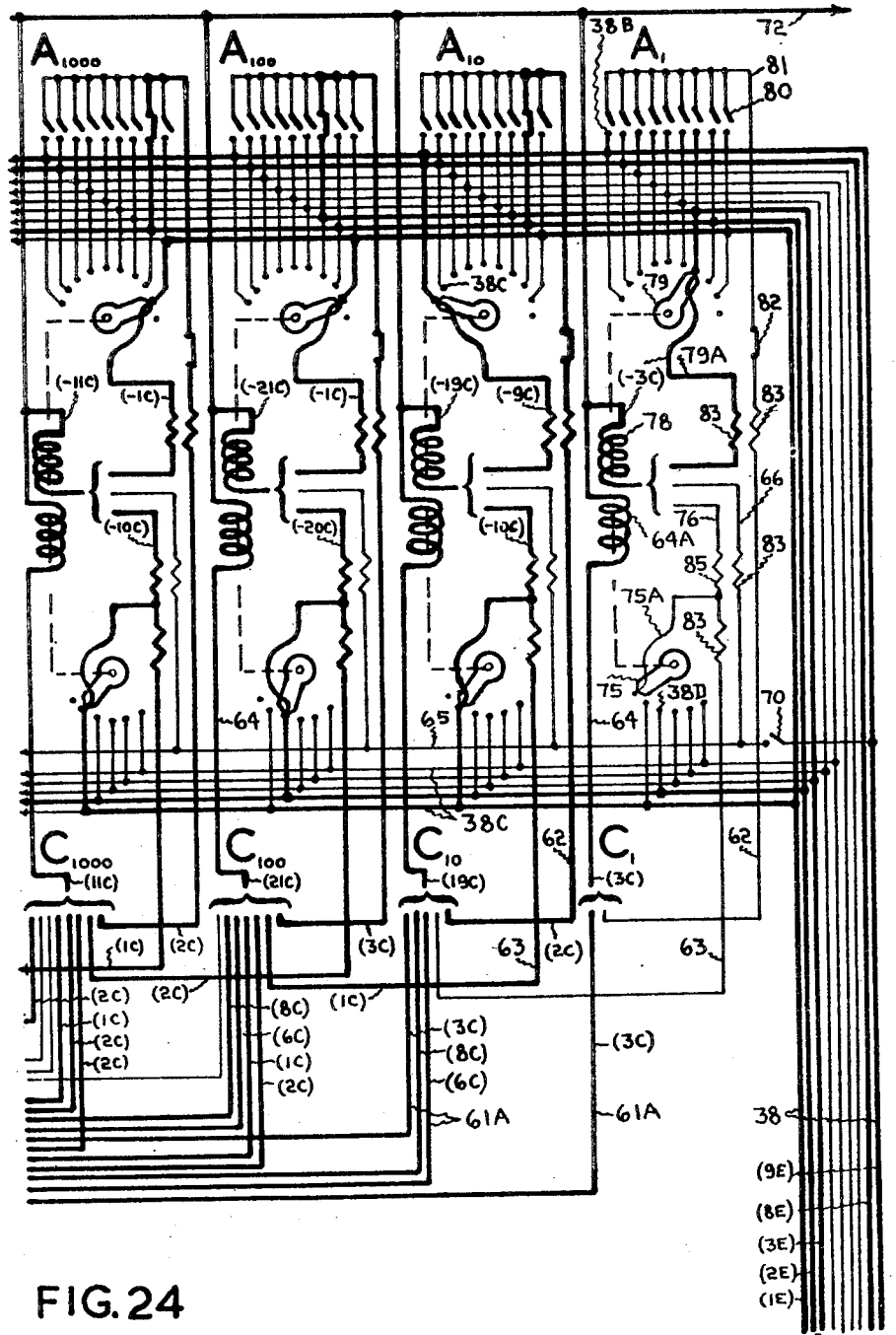
Figures 24 and 25 show a scheme of electrical connections with the help of a numerical example during the "sum cycle."
Figure 25:
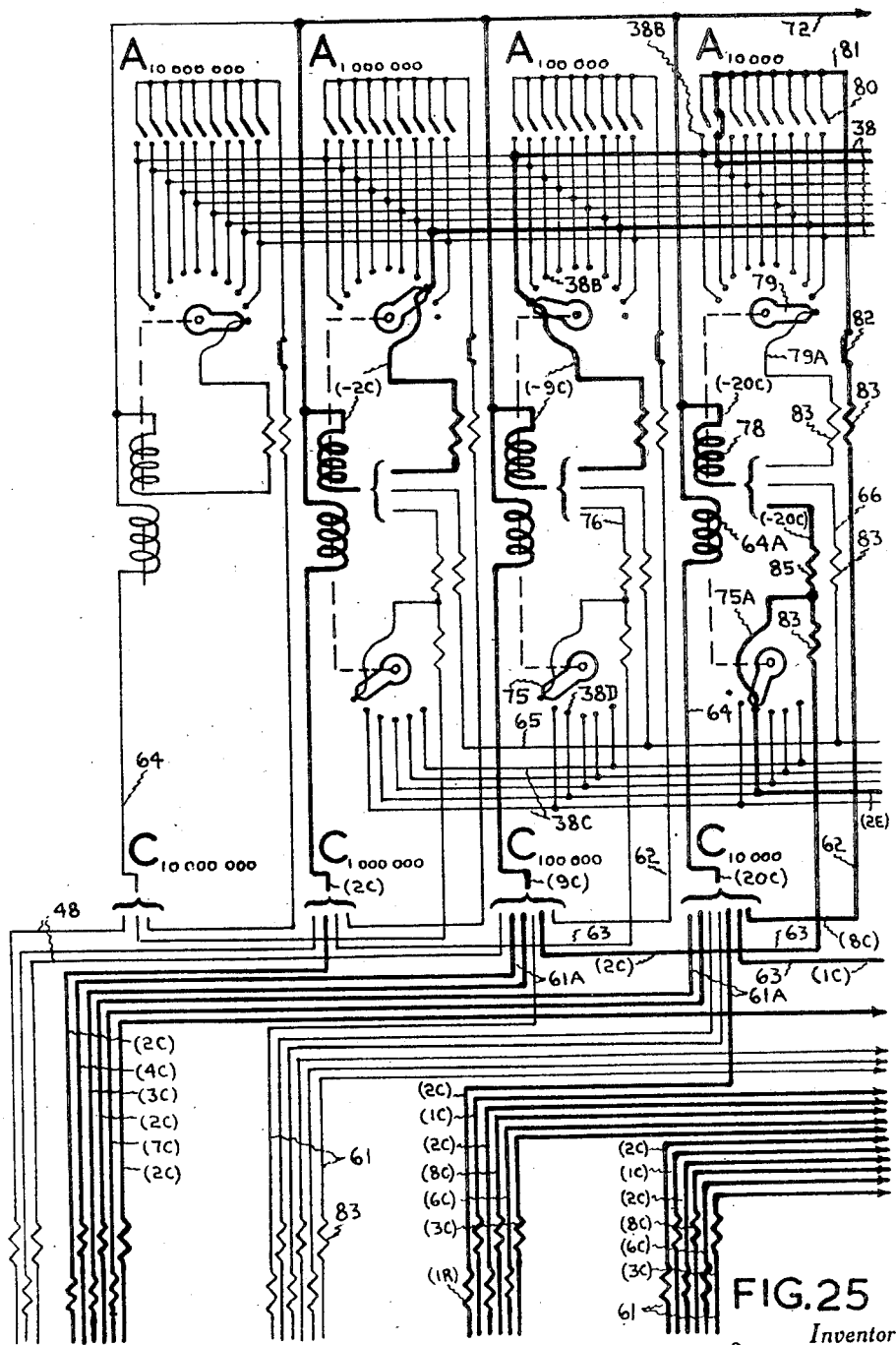

The switches 80, Figures 24 and 25, of the accumulator A are shown displaced according to the digits of the number 82,320 stored up in it; so in $A_1$ all the switches are open, in $A_{10}$ the second switch from the right is closed which thereby through the terminal 38B connects that conductor 38 with 81 which carries the voltage $(2E)$. Similarly, are closed in $A_{100}$ the third, in $A_{1,000}$ the second, and in $A_{10,000}$ the eighth switch.

The only difference in the position of the switches between the product and sum cycles is that in the latter the switches 82 are closed connecting conductors 81 to 62, thereby adding currents corresponding to the digits of 82,320 to the currents already carried in the conductors 61A and 63.

The process of calculation is otherwise exactly the same as it was in the product cycle. In Figures 24 and 25 is shown how all the special numerical values relating to this calculation are obtained and how the new result 2,901,193 is registered in the counters.

At the end of the sum cycle, after the printing of the result and the switching off of the current at 31, mechanical means controlled by the motor are provided, first to open all the switches 80 of the accumulator and then to close those switches which correspond to the positions of the brushes 79, thereby storing up in the accumulator the new result. After the new result is stored up, the brushes 75 and 79 are brought back into their initial positions, the keys 2 and 3 released, the motor stopped and the machine is then ready for the next operation.

The main resistance of the electrical circuits is formed by the small section copper wires in the coils of the counters and by the additional resistances 83 and 85, it being understood that there is one resistance 83 or 85 provided for each electrical circuit.

The resistance of the circuits is sufficiently high to make the variations of the voltage drop in the switch contacts negligible; further all the other conductors are of relatively large sections so as to make the voltage drops caused by them again negligible, and the transformer windings 34, Figure 3, are dimensioned so as to make their internal resistances very small compared with the resistances of the circuits; in these conditions the transformer functions as a constant voltage source, making to flow in the parallel circuits of equal resistance attached to their terminals, currents, the intensities of which remain practically the same independently of the number of parallel circuits, provided that number is kept within reasonable limits.

From the foregoing it results that the functioning of the machine is independent of the voltage variations in the mains, as it is only the relative intensity of the currents supplied from a common voltage source which has any effect on the functioning both of the units and tens separators and the counters. For the same reason the functioning of the machine is independent of the variations of the resistances caused by changes of temperature, provided these changes of temperature are uniform throughout the machine.

Nevertheless, as different circuits having the same resistance can carry currents of different intensity, and as the heat generated by them cannot be dissipated instantaneously, certain coils can get hotter than others with an increase of their resistances and the consequent creation of an unbalance in the electrical circuits. One way of preventing this is to make part of the resistances 83 and 85, Figures 8 and 9, of carbon. Considering that the circuits are subjected to the currents only for a short time and that good ventilation of the inside of the machine is provided, it is possible to dimension the copper windings of the coils and the carbon resistances in such a way that with rising temperature, the decrease of conductivity in copper is exactly balanced by the increase of conductivity in carbon. Part of the carbon resistance is in the form of carbon discs subjected to the pressure of an adjusting screw. As the resistance of these carbon discs varies with the pressure applied, this arrangement serves for the fine adjustment and balancing of the resistances during the assembly of the machine.

As the reactance of the electrical circuits is small compared with their resistance, the resulting phase differences will be negligible; and the reactance of the transformer can be corrected by condensers.

Having explained the functioning of the electrical scheme, the description of those mechanical details which form features of the present invention, will now follow.

Figure 26:
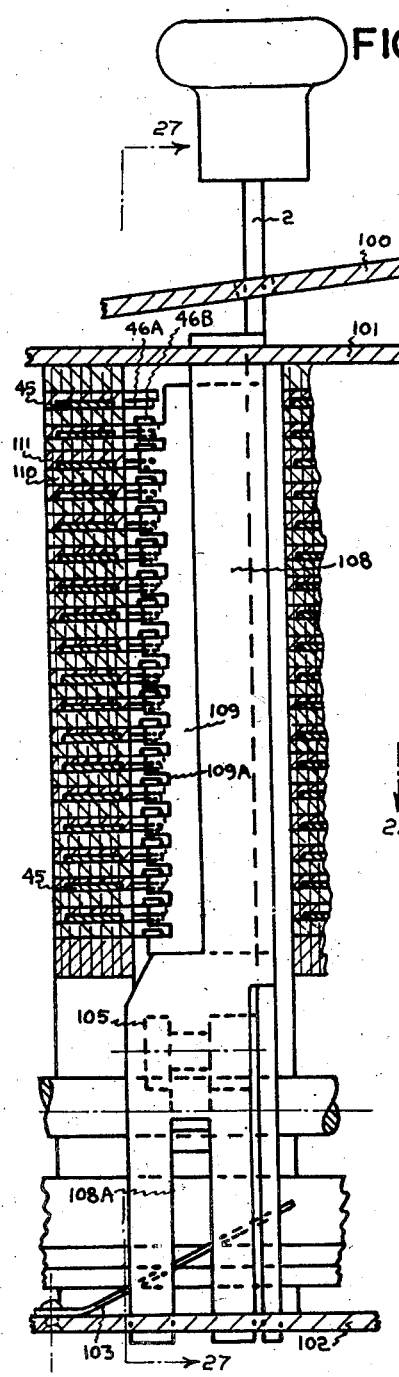
Figure 26 shows a vertical section perpendicular to the axis of the carriage of a multiplier key.
Figure 27:
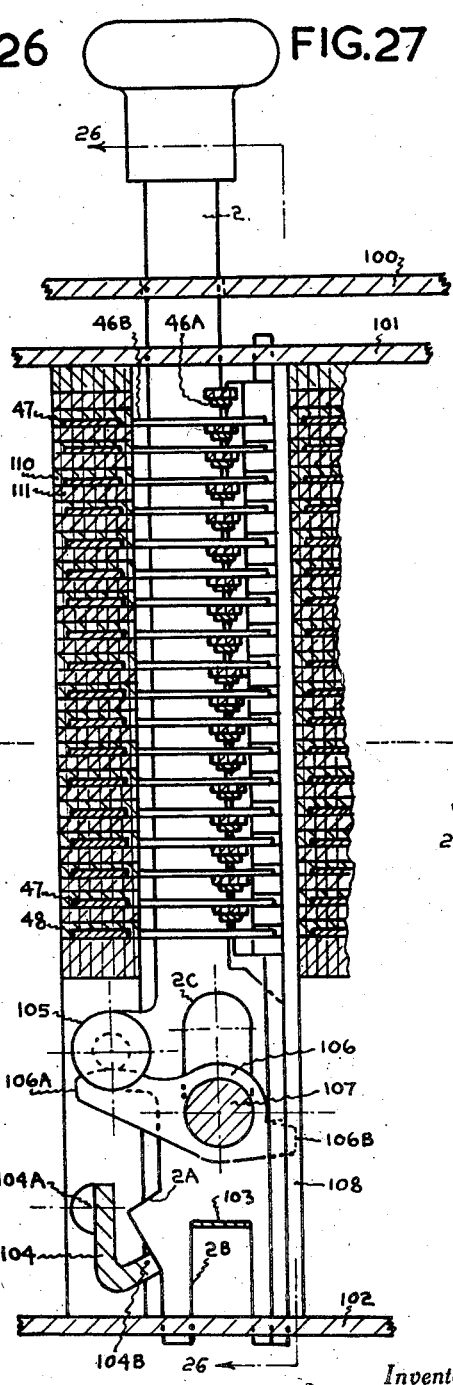
Figure 27 shows a vertical section parallel to the axis of the carriage of a multiplier key.

The structure of one of the multiplier keys is shown in Figures 26, 27, 28 and 29, Figure 26 being a vertical section taken parallel to one column of the keys along lines 26—26 in Figure 27, Figure 27 being a vertical section along lines 27—27 in Figure 26, and Figure 28 being a horizontal section along lines 28—28 in Figure 27. All these figures are shown on an enlarged scale, the actual distance in a machine between the multiplier keys being conveniently about ¾ inch.

The multiplier key 2 conveniently consists of a steel sheet strip carrying on top a button of plastic material. The key passes through an opening in the top plate 100 and is guided by slots in the plates 101 and 102. A flat spring 103 fixed at one end onto the lower plate 102 enters into the slot 2B of key 2 urging it upwards. The movement of key 2 is limited by the upper and lower ends of its slot 2C and by shaft 107 passing through the said slot parallel to the key columns. Parallel again to the same column is placed a bail 104 free to swing at its two ends around the axis 104A, springs being provided to keep its bent edge 104B pressed against the key 2 in a way that when the key is depressed, the said edge 104B engages projection 2A of key 2, keeping it thereby in the depressed position. Bails 104 can be swung in clockwise direction either by the release key 4, Figure 1, or automatically by the other mechanisms of the machine at the end of the operations to release the keys 2.

A shoulder peg 105 fixed on key 2 engages the end 106A of a lever 106 rocking around shaft 107. The other end 106B of the same lever 106 engages a gap 108A of slider 108 pushing it upwards when key 2 is depressed, lever 106 being shaped in such a way that the stroke of the slider is shorter than that of key 2 with a corresponding mechanical advantage. The slider 108 is guided by slots in the plates 101 and 102 and on it is fixed a switchblock 109 made of insulating material, along an edge of which are formed gaps 109A.

As has been set forth previously, the purpose of the multiplier keys is to connect conductors 40 and 45 with conductors 47 and 48, Figures 3, 4, 5 and 6. For greater clearness, conductors 45 and 47 and their insulating covers 110 and 111 are also shown separately in an exploded isometric view in Figure 29. Conductors 45 and 47 are made of copper strips of a section which is relatively large considering the currents they carry, conductors 45 being provided with short projecting tongues 46A and conductors 47 with long flexible tongues 46B. The insulating covers 110 and 111 are made of moulded plastic, each of them extending over the whole multiplier keyboard and arranged in alternate layers one over the other. The insulating cover 110 is provided with a channel 110A housing the conductor 47 and with openings 110B for the tongues 46B. The insulating cover 111 is provided with a channel 111A to house the conductor 45 and with openings 111B for the tongues 46A and a small projection 111C to prevent the tongues 46A from bending upwards. When the key 2 is depressed then the gaps 109A of the switchblock 109 engage the tongues 46B of conductors 47 pressing them upwards against the tongues 46A of conductors 45, thereby creating the contacts required for the functioning of the machine. The shape of the conductors 40 and 48 is identical with that of 45 and 47.

The structure of the multiplicand key 3 is identical with that of the multiplier keys 2, the only difference being in the number of conductors to be connected.

Figure 31:
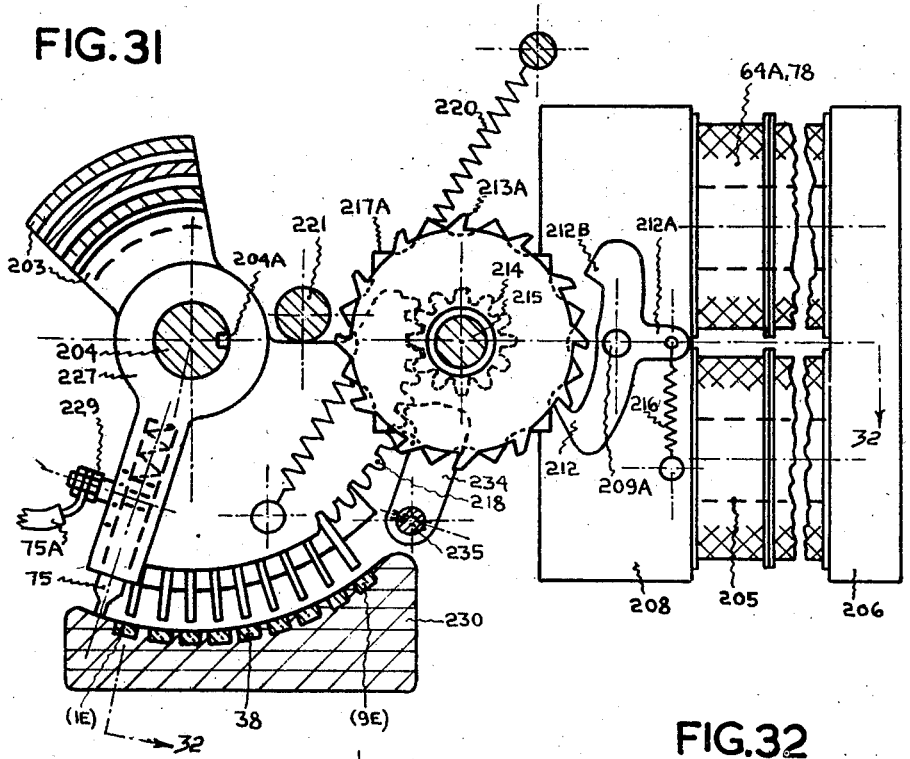
Figure 31 shows a vertical section through a counter.

The structure of the counters and that of the accumulator is shown in Figures 30, 31, 32, 33, 34, 35 and 36. Figure 30 is a plan view of the counters and the printing mechanism, with the cover plate removed and without showing the striking hammers, showing the support plates 200 fixed in the frame. Between each pair of support plates are fixed smaller support plates 201 and 233, Figure 32, for the counter mechanism and showing further in Figure 30 two stout fixed support plates 202 for the printing mechanism. The connections between the counters C and the printing mechanism are provided by rounded plates 203, the two ends of which are bent and shaped so as to form two toothed sectors 203A and 203B (see also Figures 34 and 36), the plates 203 being able to rock round the shaft 204. The rounded parts of plates 23 are placed one above the other as shown in Figures 30, 31 and 34 so as to occupy a minimum of space allowing at the same time full freedom to their relative movements and so providing a simple system of connections between the counters C and the type carrier racks 9. To obtain this simplicity, advantage has been taken of the flexibility of the electrical connections by not arranging the counters C in the usual order but in the order shown in Figure 30 so that when the counters are viewed from right to left they are arranged in the order $C_{1,000}$, $C_{100}$, $C_{10}$, $C_1$, to the right of the printing mechanism and $C_{10,000,000}$, $C_{1,000,000}$, $C_{100,000}$, $C_{10,000}$ to the left of the printing mechanism.

Figure 32:
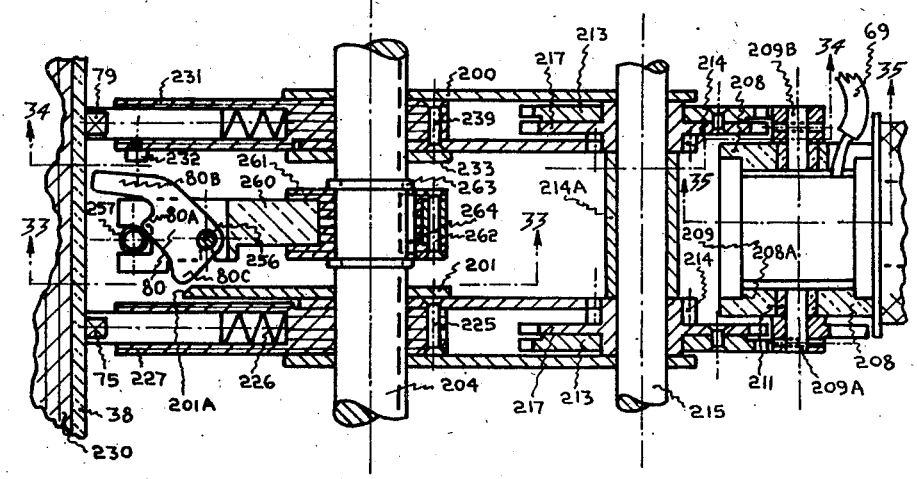
Figure 32 shows a horizontal section through the counter.

The structure of the counter and the accumulator is shown in Figures 31, 32, 33, 34 and 35, Figure 31 being a vertical section through 31—31 in Figure 30, Figure 32 a horizontal section through 32—32 in Figure 31, and Figures 33, 34 and 35 sections through 33—33, 34—34 and 35—35 in Figure 32. The coils 64A and 78 are wound on metallic spools with large flanges acting as cooling fins, and are arranged on bars of laminated soft iron 205, Figure 31. At one end the bars 205 are joined by yoke 206, at their other end they carry the pole shoes 207, Figure 35, all these parts being made of soft laminated iron. The two pole shoes are made from one piece into which, before it is divided in two parts, a central hole is bored and ground. The two shoes 207 are kept at the proper distance by two brass plates 208, Figure 32, which are fixed on the base plate of the machine. These brass plates 208 are provided with sockets 208A which fit into the central hole of the pole shoes 27 locating them exactly. In the same central hole is placed an armature 209 of laminated soft iron, Figures 32 and 35, dimensioned so as to make the air gap between itself and the pole shoes a minimum. This armature 209 carries a coil 210 supplied with current by flexible leads 69, Figure 32. When at rest this coil 210 is in the position shown in Figure 35, starting from which it can rock slightly clockwise during the operations.

The armature 209 carries two shaft extensions 209A and 209B which turn in two small self-lubricating bearings 211 fixed in the brass plates 208. On 209A is fixed an escapement pawl 212, Figure 31, which can engage the teeth 213A of the escapement wheel 213, Figure 32, connected to the pinion 214 and wheel 217, all of them turning freely on the fixed shaft 215 between the support plates 200 and spacer 214A. One arm 212A, Figure 18, of the escapement pawl 212 carries a light spring 216, the other end of which is attached to a peg on the brass plate 208, and another arm 212B can engage the triangular teeth 217A of wheel 217.

The pinion 214 engages the gear sector 218 which can rotate about the shaft 204 and which is subjected to the pull of a strong spring 220 tending to turn it counterclockwise, this action being prevented in the rest position by a bail 221 and by pawl 234 fixed on shaft 235. At the beginning of the operations, the bail 221 is swung counterclockwise around the axis of shaft 204 and at the end of the operations brings back all the sectors 218 into their initial positions.

The toothed sector 218 is rigidly connected with the brushholder 227 (made of insulating material) through rivets 225, Figure 32, the whole group being located between the support plates 200 and 201. The brushholder 227 carries the brush 75 which is pressed by compression spring 226 against conductors 38 carrying voltages from (1E) to (9E). Conductors 38 are embedded into the support 230 fixed on the frame and made of insulating plastic material moulded round the conductors. The brush 75 is made of copper and is connected to the flexible lead 75A, Figure 31, through the terminal 229.

As has been explained in the description of the electrical scheme, the brushes 75 move step by step in the first phase of the operations when the total current in the coils 64A and 78, is "positive," and stop when by additions of "negative" currents the total current is made zero or "negative." The magnetic flux produced in the counter by the coils acts upon the armature 209 and consequently upon the escapement pawl 212 so as to rock the escapement pawl counterclockwise when the total current is "positive," the working principle of this arrangement being substantially that of a single phase commutator motor. This action can always overcome the resistance of the light spring 216, the only purpose of which is to prevent those movements of the escapement pawl 212 which might be caused by vibrations or bouncing when the total current is zero.

During the first phase of the operations, after the bail 221 has been swung round counterclockwise and pawl 234 clockwise freeing the toothed sectors 218, one tooth 213A of the escapement wheel 213 is pressed against the escapement pawl 212 by the spring 220 acting on the toothed sector 218, this pressure being considerably reduced by the transmission ratio between the pinion 214, and toothed sector 218. When the total current is "positive," the escapement pawl 212 is rocked counterclockwise until its arm 212B is stopped by the root circle of wheel 217. By the effect of spring 220, sector 218 and pinion 214 the two wheels 213 and 217 are now moved clockwise, first the tooth 213A passing under the escapement pawl 212, then the triangular tooth 217A beginning to act on the arm 212B bringing the escapement pawl back to its initial position and then leaving it free, this last action being synchronized with the movement of the brushholder 227 in such a way that by the time the escapement pawl is back in its initial position, the brush 75 is already in contact with the next conductor 38. If now the total current in the coils becomes zero or negative, the escapement pawl remains in its initial position and stops the next tooth 213A, stopping thereby the movement of the brush 75 after the first step. If, however, the total current in the coils is still positive, the escapement pawl 212 is rocked again counterclockwise before it is reached by the tooth 213A, repeating the above process and further making the step by step movement of the brushes practically continuous with a corresponding increase of speed. These processes are repeated until after a certain number of steps the total current in the coils becomes zero or negative.

Figure 36:
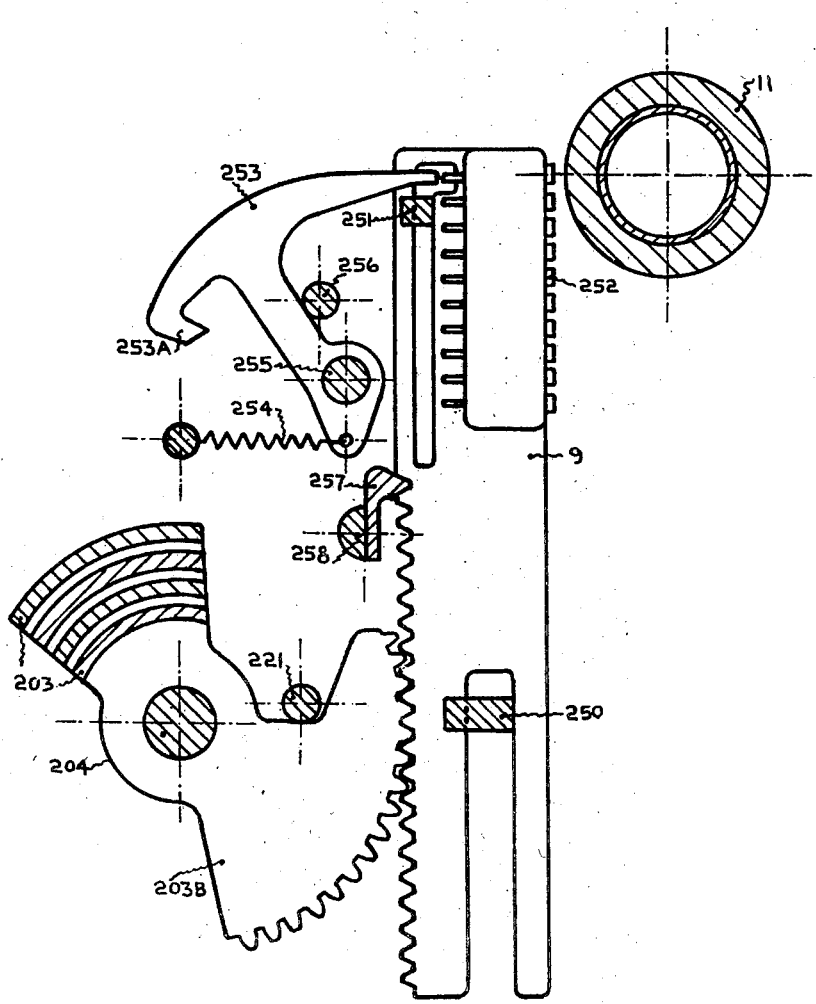
Figure 36 shows a vertical section through the printing mechanism.

At the end of the first phase of the operations the pawl 234 is swung counterclockwise locking the sectors 218 in the positions they have reached. At the same time, corresponding to the opening of the switch 70, Figure 8, a pawl 257, Figure 36, is swung counterclockwise, freeing the racks 9 and consequently the geared sectors 203B and 203A, Figure 34. The other shaft extension 209B of the armature 209, Figure 32, carries another escapement pawl 212 which co-operates in a manner identical to that described above through escapement wheels 213 and 217 and pinion 214 with the geared sector 203A, Figure 34.

The toothed sector 203A freely rotates around the shaft 204 and is subjected to the pull of a strong spring 237, all the sectors 203A being further subjected to the action of the bail 221. A brushholder 231 (made of insulating material) is fixed on the toothed sector 203A by rivets 239, Figure 32, the whole group being located between the support plates 200 and 233. The brush 79 of the brushholder 231 is pressed by the compression spring 226 against the conductors 38.

The brush 79 is made of copper, it carries a terminal 241 to which the flexible lead 79A is attached and further it carries a hardened steel peg 232, the function of which will be described later.

In a manner identical to that previously described in connection with the brush 75 during the first phase when during the second phase the total current in the coils 64A and 78 is positive, the brush 79 is moved counterclockwise step by step, stopping when the total current in the coils becomes zero, this number of steps corresponding to one of the digits of the result of the calculations. These step movements are transmitted by the toothed sector 203A, rounded plate 203 and toothed sector 203B, Figure 36, to the corresponding type carrier rack 9. The rack 9 is guided by the slotted transverse bars 250 and 251 and carries the types 252 kept in their positions by small springs and arranged in order from "0" to "9" starting from the top. At the end of the movements, the type corresponding to the number of steps of brushholder 79 stops on the line connecting the striking hammers 253 with the rubber cylinder 11. The striking hammers 253 turn freely around the fixed shaft 255, are subjected to the pull of springs 254, and are controlled by the bail 256. After having reached their final positions, the type carrier racks 9 are held therein by pawls 257, which, rocking clockwise around the axis 258, engage the gaps of the type carrier racks.

The remaining details of the printing mechanism are similar to those of other calculating or adding machines and well known to those skilled in the art and therefore will not be described in detail. Provision is made to turn the striking hammers 253 anticlockwise by means of the bail 256 into a position in which their ends 253A remain hooked by other parts, the bail 256 returning into its initial position; further means are provided to release at the appropriate moment those hammers which correspond to type carrier racks moved from their initial positions, and to let them strike the types 252 and so print the corresponding digits on the paper strip. Further means are provided for the paper feed, to print the noughts to the left of the printed number; to avoid printing the noughts between the multiplicand and the multiplier in the factor cycle; and to print all those special signs which might be required.

The accumulator is shown in Figures 32 and 33. Each group of the accumulator consists of a copper body 260 fixed on the shaft 204, and insulated from it by means of insulating bushes 261, rivets 262, circlips 263 and a key 264 fitting in the keyway 204A of said shaft 204. The body 260 carries also a terminal 265 to which the conductor 81 is attached and it is further provided with nine slots in which the switches 80 can rock around the bent wire 256 placed in a circular groove of the said body 260. In an annular groove of the body 260 is placed a tension spring 257 bent around a circular arc and having its ends attached to two pegs 258 fixed on the body 260. The nose 80A of switch 80 extends this spring 257 during the passage from the "on" to the "off" position and the switch 80 is held in either of such positions by the same spring. In Figure 32 the switch 80 is shown in the "off" position; in the "on" position the switch 80 is turned anticlockwise until the nose 80B is pressed against the conductor 38.

Only one or none of the nine switches can be in the "on" position at one time, connecting thereby conductor 81 to any of the selected conductors 38, the position of the selected switch corresponding to the digit stored up in the accumulator.

The shaft 204 cannot rotate but it can carry out small movements along its axis in both directions. At the end of the sum cycle, after the current is switched off by opening switch 31, Figure 3, and the type carrier racks 9, Figure 36, are held by the pawls 257, the shaft 204, Figure 32, is moved first to the right engaging thereby the noses 80C of switches 80 which are in the "on" positions with the bevelled edge 201A of the support plate 201, and rocks these said switches 80 clockwise thereby pushing them all in to the "off" position, and so zeroising the accumulator; then the shaft 204 is moved to the left, making the peg 232 on the brushholder 231, Figures 32 and 34, push that switch 80 into the "on" position which corresponds to the digit indicated by that counter; in this way the digits of the new result are stored up in the accumulator which then is brought back into its initial middle position.

Addition is carried out by registering the addendum on the multiplicand keyboard and depressing the addition key 6, Figure 1. In this case, only the factor and sum cycles are carried out, the factor cycle in the usual way and the sum cycle with the difference of closing switches 42, Figure 6, and opening 43, Figure 7, and 44, Figure 3, these switch positions resulting in the multiplication of the multiplicand by one.

The subtotal is obtained by depressing the subtotal key 7, Figure 1. Only the sum cycle is then carried out and as there is nothing registered on the keyboards, the number stored up in the accumulator is printed and then registered again in the same accumulator.

The total is obtained by depressing the total key 8. The operation is similar to that of the subtotal with the difference that shaft 204, Figure 32, after having moved to the right does not move to the left but returns immediately into its initial middle position, so that after zeroising of the accumulator no new digits are stored up in it.

Having now particularly decribed a preferred embodiment of the present invention, other possible ways will be mentioned briefly, referring both to possible alterations of the details described and to possible embodiments in machines of a type different from the one described.

Instead of using alternating currents, direct currents can be used, supplied by rectifiers, valves or batteries; these sources of direct current voltages could be used in connection with electronic voltage regulation.

The resistances in the machine, consisting of a combination of carbon and small section copper wire in the coils, may be replaced by an alloy having the characteristic of not changing its conductivity with changes of temperature.

The resistances in the circuits may be placed just before the entry of the conductors into the coils of the counters, the conductors themselves being united at a point between the resistances and the coils, the coils themselves being made of large section copper wires of negligible resistance with a consequent reduction in the number of coils to two in the counters, one for the "positive" and the other for the "negative" currents.

Especially in machines of small capacity, the armature and pole shoes structure 207 and 209 in Figure 35 may be replaced by a standard type relay similar to those used in automatic telephony, with the object of a more economical though less sensitive design. The armatures of the counters, instead of acting directly on the escapement mechanism, may act on a switch, which in turn would control a solenoid acting on the escapement mechanism.

The machine can be adapted for the operation of subtraction. For this purpose the machine is fitted with two additional control keys, one at the side of the addition key for the subtraction of simple numbers, the other at the side of the multiplication key for the subtraction of products. The factor and product cycles will remain identical, but in the sum cycle the fixed current of ($-9C$) in the conductors 66 is always switched off; further reversing switches will be introduced which reverse the currents in all the coils of the counters with the exception of that coil which is fed from the accumulator, further the current in the armature is reversed during the first phase, remaining unaltered during the second phase, and so in the counters is registered the difference between the number stored up in the accumulator during the previous operations and the subtracted product.

If desired, a machine can be adapted to print the negative balance. For this purpose, the mutual action of the counters is completed by making the counter of the highest order act upon the units counter $C_1$, further to the nine conductors 38 and nine switches 80, Figures 8 and 9, a tenth conductor and a tenth switch are added opposite each other, the tenth switch being placed so as to be acted upon by the peg 232, Figure 32, of the brushholder 231 when the latter is in the zero position. In normal conditions this tenth conductor carries no current, but when a negative balance is printed, the currents in the conductors 38 are changed by replacing them by their complements to nine, making to flow in the tenth conductor a current of ($9C$) and in the conductor which before carried a current of ($1C$) now a current of ($8C$) and so on. The printing of the negative balance can be made automatic by a device acted upon by the passage of currents between the counter of highest order and the units counter $C_1$.

The machine may be adapted to carry out the operation of division by any of the well known systems of repeated subtractions usual in other calculating machines.

The machine may be built in such a way that the total in the sum cycle is printed only when it is desired, by pressing down the total or the subtotal key. In this type, a second set of counters is provided for the sum cycle, allowing the machine to carry out the product and the sum cycles at the same time with a corresponding increase of speed. Further in the same type an additional set of counters or an equivalent printing mechanism may be provided for the factor cycle, thus enabling the machine to carry out all the three cycles simultaneously, its carriage remaining stationary.

Figure 4:
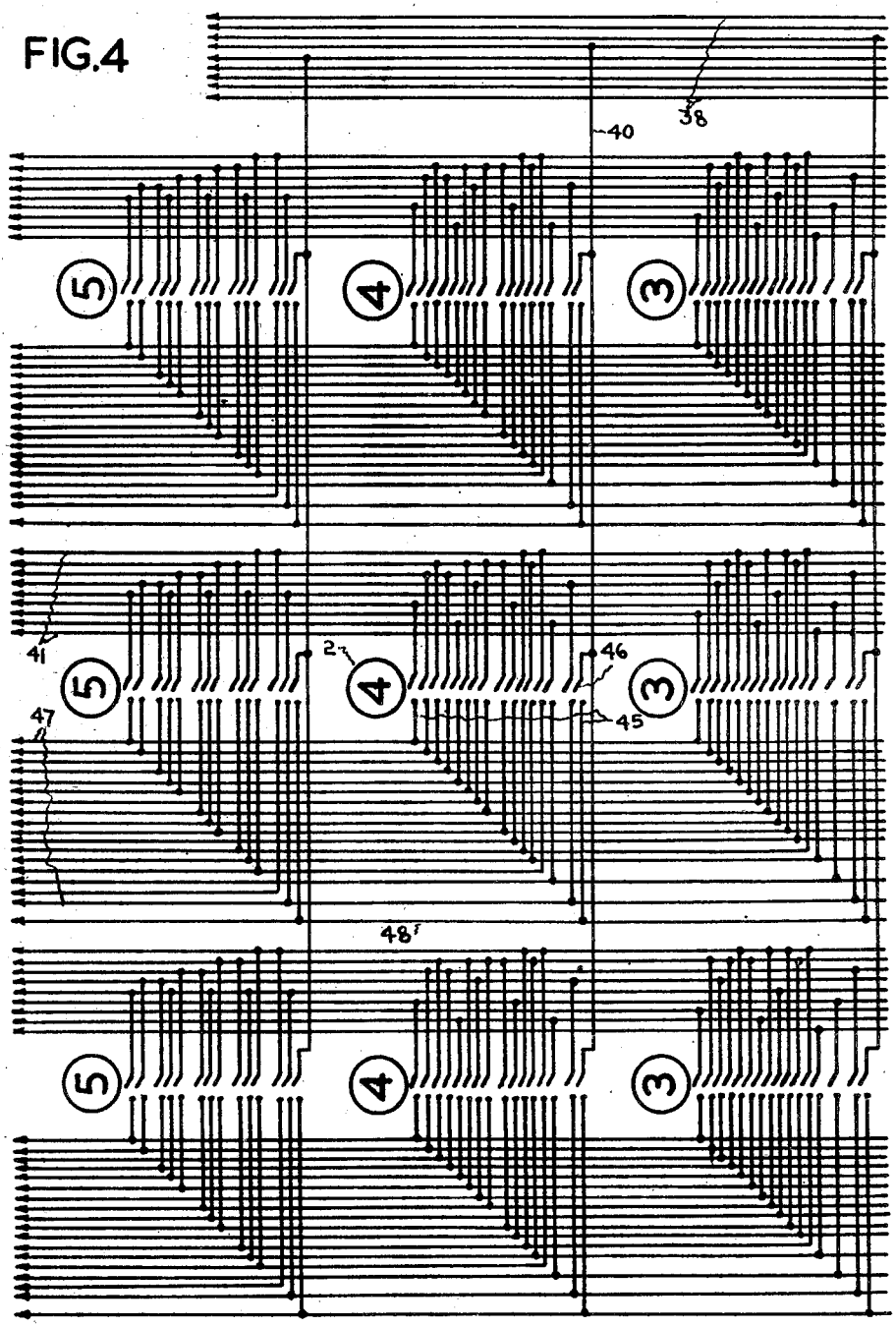
Figure 5:
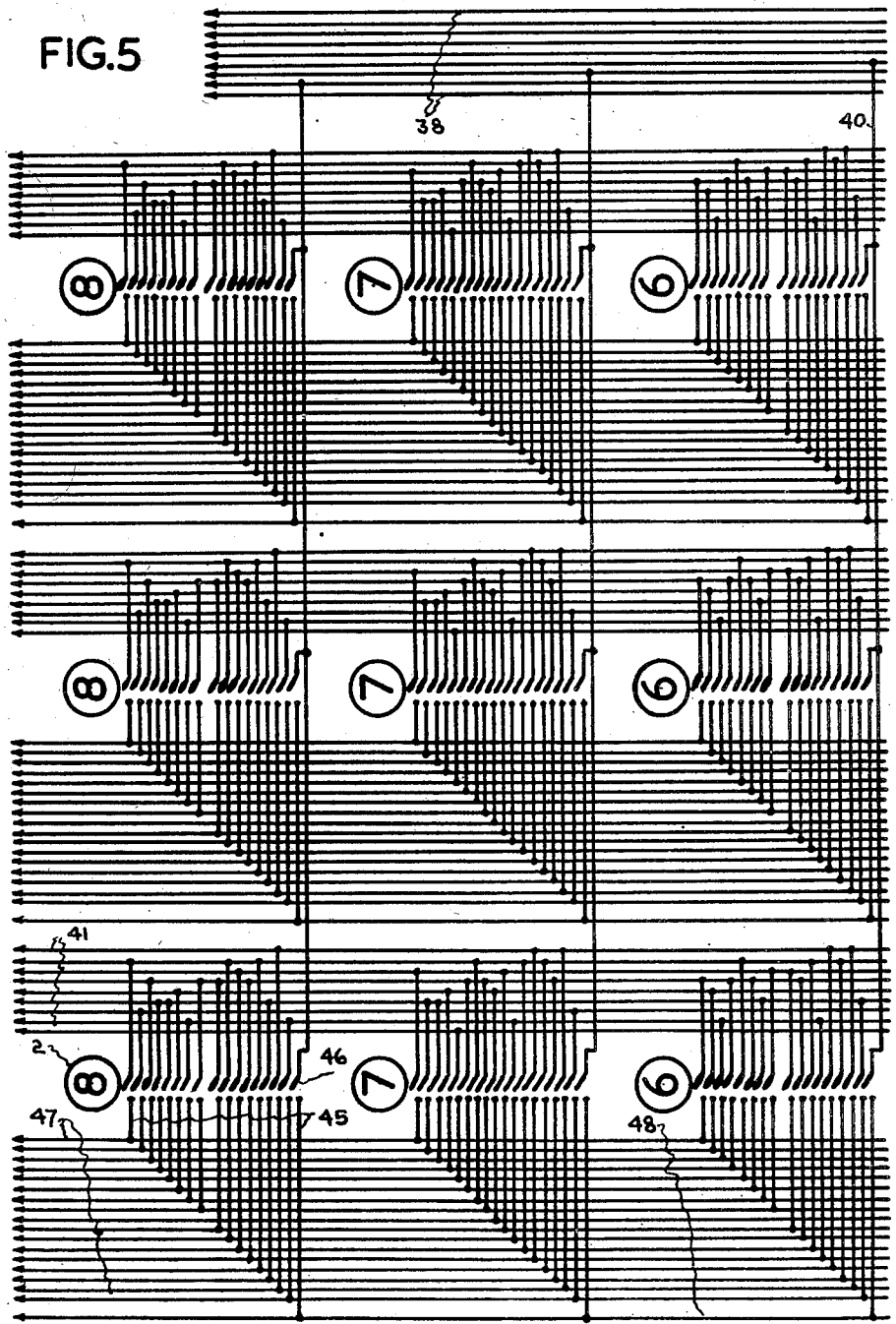

The machine may be adapted to the multiplication of a decimal number by another belonging to a non-decimal system, e. g. to the multiplication of a principal expressed in pounds, shillings and pence by a percentage. Further the machine may be adapted to the multiplication of two non-decimal numbers, even when the two numbers belong to two different non-decimal systems, e. g. the multiplication of a weight given in tons, hundredweights, quarters and pounds with a price given in pounds, shillings and pence. In this case of multiplication of non-decimal numbers, the resistances 35, Figures 8 and 9, in the different circuits are of appropriate values and the pattern of connections between conductors 41 and 45, Figures 3, 4 and 6, is rearranged so as to represent the partial products of special non-decimal multiplication tables; further said pattern can be arranged so as to represent decimal or non-decimal partial products referred to any system of bases conveniently chosen and different from ten; e. g. in multiplications with pounds, shillings and pence a convenient system of bases is 12, 3 and 1 and a number 321 on these bases will be equivalent to $3 \times 12 + 2 \times 3 + 1 \times 1$, i. e. corresponding to the number 43 in the decimal system.

In the case of approximate multiplications, when the rounding off of the last digit is required, a special rounding off conductor and coil is added to counter $C_1$, which carries always a current of fixed and suitably chosen intensity.

The machine may be provided with one or more fixed multipliers, selected by a corresponding number of keys.

The two full keyboards may be replaced by two ten keys keyboard or by one single ten keys keyboard on which first the multiplicand and then after the depression of a special control key, the multiplier is registered.

The operation of the machine may be controlled by punched cards, the products and sums being either printed or punched out on cards.

The machine may be built without incorporating the accumulator, and used for the calculation of products only. When controlled by punched cards, this type of machine may form an intermediate station of the punched card cycle, carrying out the multiplication of factors punched previously on the cards and then punching the products on the same cards.

The machine when fitted with a number of accumulators conveniently interconnected may be used for scientific purposes, as an instrument of research.

Having thus described my invention, what I claim is:

1. In a digital calculating machine, a register adapted to be connected to a series of current sources of different intensities proportional to the desired digit divided into a units digit current and a tens digit current, a series of switches for effecting such connections, and means for operating the switches which first disconnects all the switches from their respective current sources at the end of each arithmetical operation which involves the functioning of the register, and sequentially connects the said switches to current sources corresponding to the digits of the arithmetical sum or difference of the figures obtained by the operation of the calculating means and those stored up in the register during the previous operation.

2. In a digital calculating machine, a counting device including an electromagnetic wound with a series of coils which receive respectively electric currents of intensities proportional to the desired digit divided into a units digit current and a tens digit current and are wound in a common direction, step-by-step switching means controlled by the current flowing in said coils to deliver to a counter other currents of like value to the proportional currents, and a second series of coils receiving similar currents which act on the same magnet but are wound in an opposite direction so that the switch is moved to the step at which the current or currents in one set of coils balance the current or currents in the other set of coils and the switch stops in the correct position.

3. A digital calculating machine which includes a series of electrical current sources arranged to supply currents of intensities proportional to the desired digit divided into a units digit current and a tens digit current, mechanism for indicating the product of the multiplication of two factors, two factor keyboards for selecting currents from said sources which are proportional to the partial products of the multiplication table, means for controlling the operation of the indicating mechanism by the agency of such selected proportional currents, a counting device including an electromagnet wound with a series of coils which receive respectively electric currents of intensities proportional to the digits and are wound in a common direction, and step-by-step switching means controlled by the current flowing in said coils to deliver other currents of like value to the proportional currents.

4. A digital calculating machine which includes a series of electrical current sources arranged to supply currents of intensities proportional to the desired digit divided into a units digit current and a tens digit current, mechanism for indicating the product of the multiplication of two factors, two factor keyboards for selecting currents from said sources which are proportional to the partial products of the multiplication table, means for controlling the operation of the indicating mechanism by the agency of such selected proportional currents, a counting device including an electromagnet wound with a series of coils which receive respectively electric currents of intensities proportional to the digits and are wound in a common direction, step-by-step switching means controlled by the current flowing in said coils to deliver other currents of like value to the proportional currents, and a second series of coils receiving similar currents which act on the same magnet but are wound in an opposite direction so that the switch is moved to the step at which the current or currents in one set of coils balance the current or currents in the other set of coils and the switch stops in the correct position.

5. A calculating machine which includes a series of electrical current sources arranged to supply currents of intensities proportional to unit digits and others proportional to tens digits, mechanism for indicating the product of the multiplication of two factors, two factor keyboards for selecting currents from said sources which are proportional to the partial products of the multiplication table, means for controlling the operation of the indicating mechanism by the agency of such selected proportional currents, a digit and tens separating device including an electromagnet wound with a series of coils in a common direction which receive respectively electric currents of intensities proportional to products resulting from the multiplication of one digit by another digit, a coil carrying a constant current of nine-digit intensity acting on the same magnet but in opposition to the proportional current or currents, and a step-by-step switching means controlled by the currents flowing in said coils which injects an appropriate other current into the counter of the next higher order when the proportional current or currents has an intensity corresponding to ten or more, the said switching means remaining inoperative when the proportional current is of digit intensity and allowing such current to proceed direct to an associated counting device.

6. A calculating machine which includes a series of electrical current sources arranged to supply currents of intensities proportional to unit digits and others proportional to tens digits, mechanism for indicating the product of the multiplication of two factors, two factor keyboards for selecting currents from said sources which are proportional to the partial products of the multiplication table, means for controlling the operation of the indicating mechanism by the agency of such selected proportional currents, a digit and tens separating device including an electromagnet wound with a series of coils in a common direction which receive respectively electric currents of intensities proportional to products resulting from the multiplication of one digit by another digit, a coil carrying a constant current of nine-digit intensity acting on the same magnet but in opposition to the proportional current or currents, a step-by-step switching means controlled by the currents flowing in said coils which injects an appropriate other current into the counter of the next higher order when the proportional current or currents has an intensity corresponding to ten or more, the said switching means remaining inoperative when the proportional current is of digit intensity and allowing such current to proceed direct to an associated counting device, and another switching means arranged to control another circuit including a coil acting on the said magnet in opposition to the proportional current or currents, said second mentioned switching means being operated concurrently with the first mentioned switching means to deduct from the proportional current effect on the magnet, an effect corresponding to the current injected into the next higher order counter.

LESLIE DELFIN.

REFERENCES CITED

The following references are of record in the file of this patent:

UNITED STATES PATENTS

| Number | Name | Date |
| --- | --- | --- |
| 877,312 | Evershed | Jan. 21, 1908 |
| 1,515,995 | Bryce | Nov. 18, 1924 |
| 2,108,146 | Simpson | Aug. 26, 1930 |
| 2,237,153 | Neumann-Lezius | Apr. 1, 1941 |
| 2,310,438 | Johnson | Feb. 9, 1943 |
| 2,386,425 | Brank | Oct. 9, 1945 |

FOREIGN PATENTS

| Number | Country | Date |
| --- | --- | --- |
| 483,906 | Great Britain | Apr. 25, 1938 |